(12) United States Patent
Stam et al.

(10) Patent No.: US 6,429,594 B1
(45) Date of Patent: Aug. 6, 2002

(54) CONTINUOUSLY VARIABLE HEADLAMP CONTROL

(75) Inventors: Joseph S. Stam; Jon H. Bechtel; Frederick T. Bauer, all of Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/938,774

(22) Filed: Aug. 24, 2001

Related U.S. Application Data

(63) Continuation of application No. 09/546,858, filed on Apr. 10, 2000, now Pat. No. 6,281,632, which is a continuation of application No. 09/157,063, filed on Sep. 18, 1998, now Pat. No. 6,049,171.

(51) Int. Cl.[7] .................................................. B60Q 1/02
(52) U.S. Cl. ............... 315/82; 250/208.1; 250/214 AL; 307/10.8; 340/469; 340/939
(58) Field of Search .................. 315/82, 77; 250/208.1, 250/214 AL; 307/10.8; 340/437, 438, 468, 469, 936, 939; 362/464, 465

(56) References Cited

U.S. PATENT DOCUMENTS

| | | | |
|---|---|---|---|
| 2,632,040 A | 3/1953 | Rabinow | 175/321 |
| 2,827,594 A | 3/1958 | Rabinow | 315/83 |
| 4,139,801 A | 2/1979 | Linares | 315/83 |
| 4,236,099 A | 11/1980 | Rosenblum | 315/83 |
| 4,357,558 A | 11/1982 | Massoni et al. | 315/83 |
| 4,376,909 A | 3/1983 | Tagami et al. | 315/82 |
| 4,599,544 A | 7/1986 | Martin | 315/83 |
| 4,665,321 A | 5/1987 | Chang et al. | 307/10.8 |
| 4,692,798 A | 9/1987 | Seko et al. | 358/93 |
| 4,727,290 A | 2/1988 | Smith et al. | 315/82 |
| 4,768,135 A | 8/1988 | Kretschmer et al. | 362/66 |
| 4,862,037 A | 8/1989 | Farber et al. | 315/83 |
| 4,891,559 A | 1/1990 | Matsumoto et al. | 315/82 |
| 4,930,742 A | 6/1990 | Schofield et al. | 248/475.1 |
| 4,956,591 A  * | 9/1990 | Schierbeek et al. | 318/483 |
| 4,967,319 A | 10/1990 | Seko | 362/61 |
| 5,036,437 A | 7/1991 | Macks | 362/61 |

(List continued on next page.)

FOREIGN PATENT DOCUMENTS

| | | |
|---|---|---|
| DE | 2946561 | 5/1981 |
| FR | 2641237 | 7/1990 |
| FR | 2726144 | 4/1996 |
| JP | 8-166221 | 6/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Christopher M. Kormanyos, SAE Paper No. 980003, pp. 13–18.
Franz–Josef Kalze, SAE Paper No. 980005, pp. 23–26.
J.P. Löwenau et al., SAE Paper No. 980007, pp. 33–38.
Tohru Shimizu et al., SAE Paper No. 980322, pp. 113–117.

*Primary Examiner*—Don Wong
*Assistant Examiner*—Thuy Vinh Tran
(74) *Attorney, Agent, or Firm*—Price, Heneveld, Cooper, DeWitt & Litton; Brian J. Rees

(57) ABSTRACT

A system for automatically controlling continuously variable headlamps on a controlled vehicle includes an imaging system capable of determining lateral and elevational locations of headlamps from oncoming vehicles and tail lamps from leading vehicles. The system also includes a control unit that can acquire an image from in front of the controlled vehicle. The image covers a glare area including points at which drivers of oncoming and leading vehicles would perceive the headlamps to cause excessive glare. The image is processed to determine if at least one oncoming or leading vehicle is within the glare area. If at least one vehicle is within the glare area, the headlamp illumination range is reduced. Otherwise, the illumination range is set to full illumination range.

30 Claims, 21 Drawing Sheets

U.S. PATENT DOCUMENTS

| | | | | |
|---|---|---|---|---|
| 5,072,154 A | | 12/1991 | Chen | 315/82 |
| 5,086,253 A | | 2/1992 | Lawler | 315/83 |
| 5,124,549 A | | 6/1992 | Michaels et al. | 250/237 R |
| 5,182,502 A | | 1/1993 | Slotkowski et al. | 307/10.8 |
| 5,187,383 A | | 2/1993 | Taccetta et al. | 307/10.8 |
| 5,235,178 A | | 8/1993 | Hegyi | 250/226 |
| 5,329,206 A | | 7/1994 | Slotkowski et al. | 315/159 |
| 5,416,318 A | | 5/1995 | Hegyi | 250/226 |
| 5,426,294 A | | 6/1995 | Kobayashi et al. | 250/226 |
| 5,434,407 A | | 7/1995 | Bauer et al. | 250/226 |
| 5,451,822 A | | 9/1995 | Bechtel et al. | 250/226 |
| 5,471,515 A | | 11/1995 | Fossum et al. | 377/60 |
| 5,508,592 A | | 4/1996 | Lapatovich et al. | 315/248 |
| 5,537,003 A | | 7/1996 | Bechtel et al. | 315/82 |
| 5,550,677 A | | 8/1996 | Schofield et al. | 359/604 |
| 5,614,788 A | * | 3/1997 | Mullins et al. | 315/82 |
| 5,660,454 A | | 8/1997 | Mori et al. | 362/61 |
| 5,666,028 A | | 9/1997 | Bechtel et al. | 315/82 |
| 5,715,093 A | | 2/1998 | Schierbeek et al. | 359/601 |
| 5,760,962 A | * | 6/1998 | Schofield et al. | 359/604 |
| 5,796,094 A | | 8/1998 | Schofield et al. | 250/208.1 |
| 5,811,888 A | | 9/1998 | Hsieh | 307/10.8 |
| 5,812,321 A | | 9/1998 | Schierbeek et al. | 359/601 |
| 5,837,994 A | | 11/1998 | Stam et al. | 250/208.1 |
| 5,841,126 A | | 11/1998 | Fossum et al. | 250/208.1 |
| 5,877,897 A | * | 3/1999 | Schofield et al. | 359/604 |
| 5,912,534 A | * | 6/1999 | Benedict | 315/82 |
| 5,923,027 A | | 7/1999 | Stam et al. | 250/208.1 |
| 5,942,853 A | | 8/1999 | Piscart | 315/82 |
| 5,990,469 A | * | 11/1999 | Bechtel | 250/208.1 |
| 6,008,486 A | | 12/1999 | Stam et al. | 250/208.1 |
| 6,049,171 A | | 4/2000 | Stam et al. | 315/82 |
| 6,097,023 A | | 8/2000 | Schofield et al. | 250/208.1 |
| 6,130,421 A | | 10/2000 | Bechtel et al. | 250/208.1 |
| 6,144,158 A | | 11/2000 | Beam | 315/82 |

\* cited by examiner

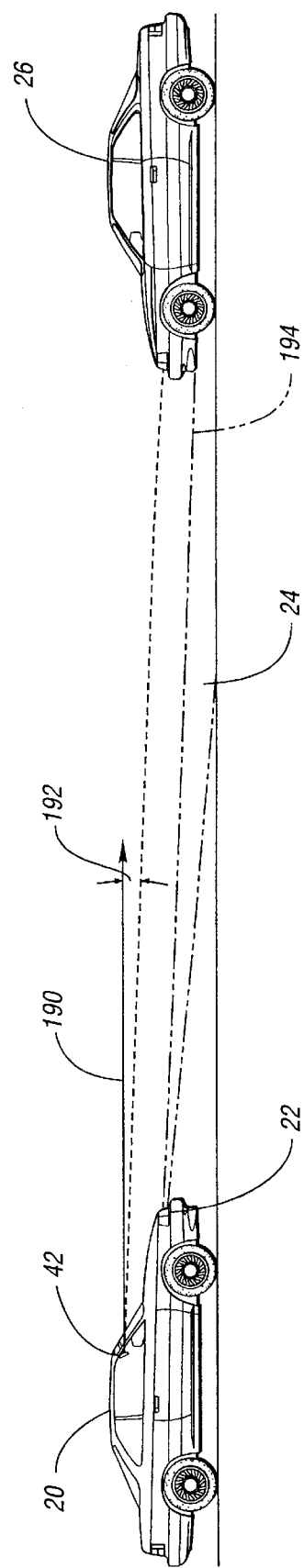
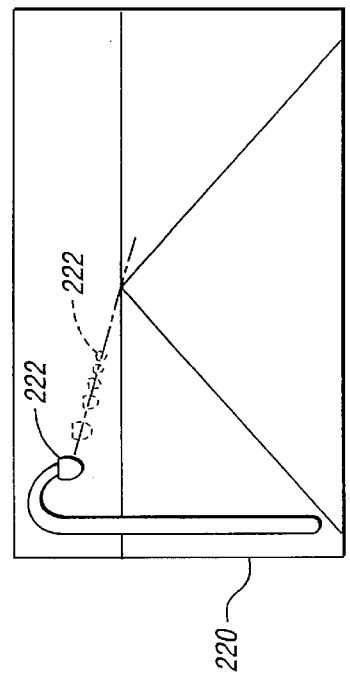

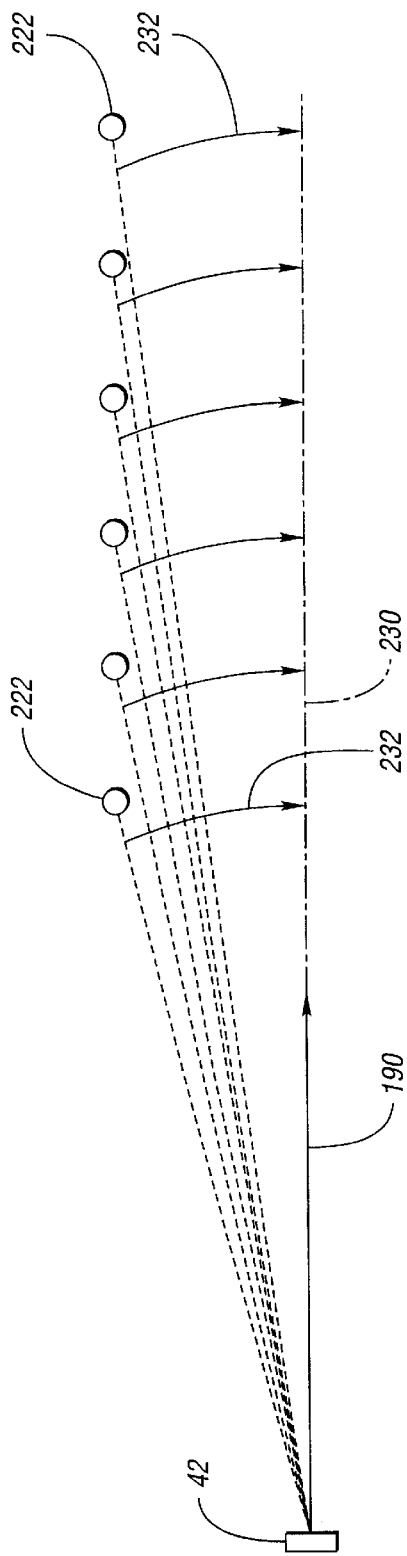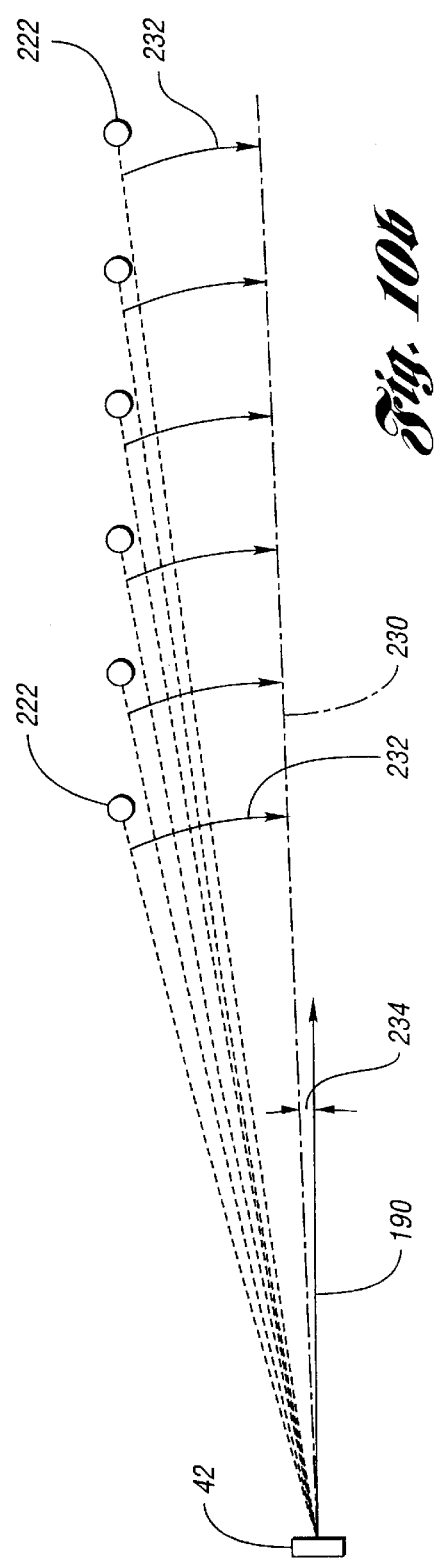

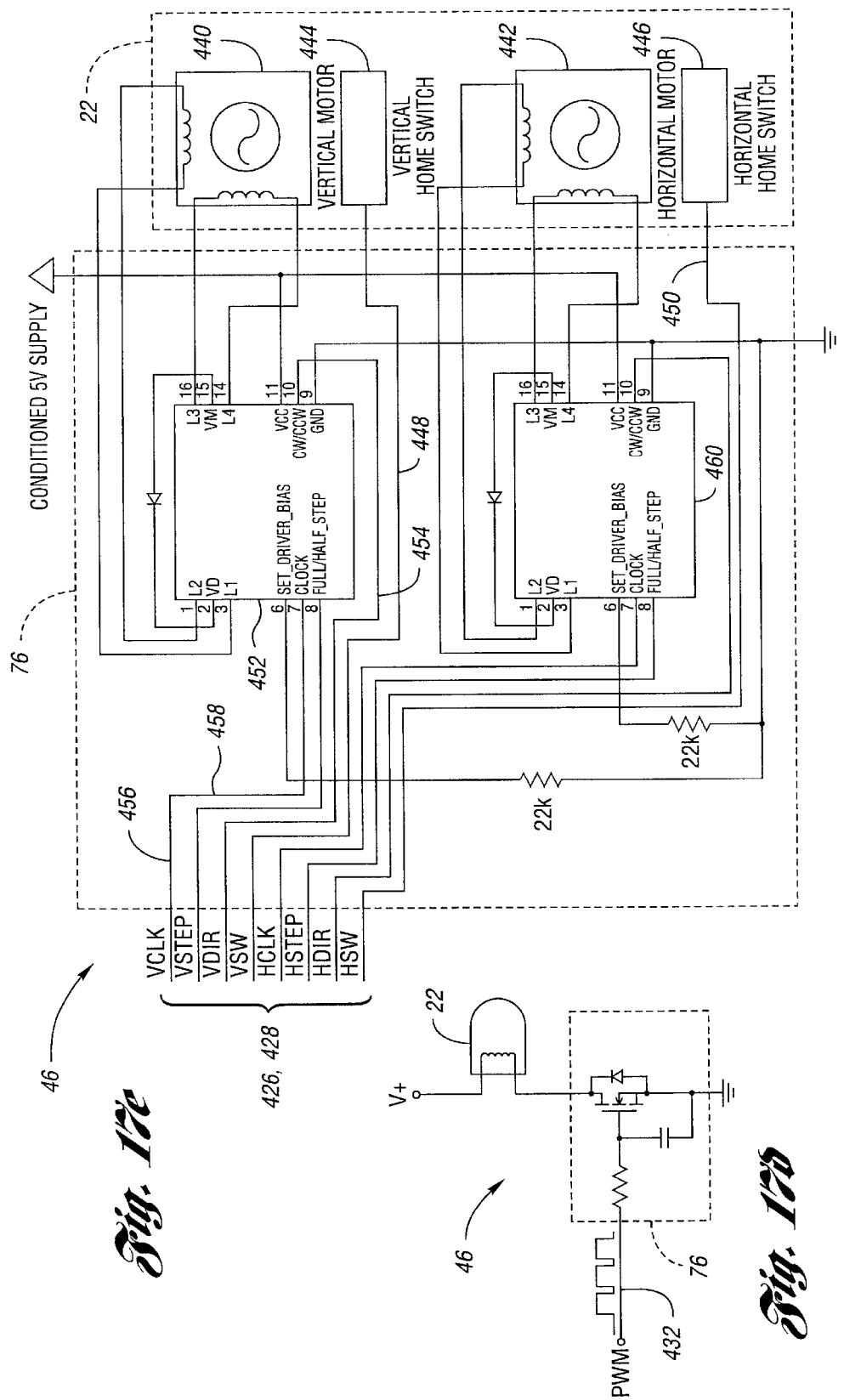

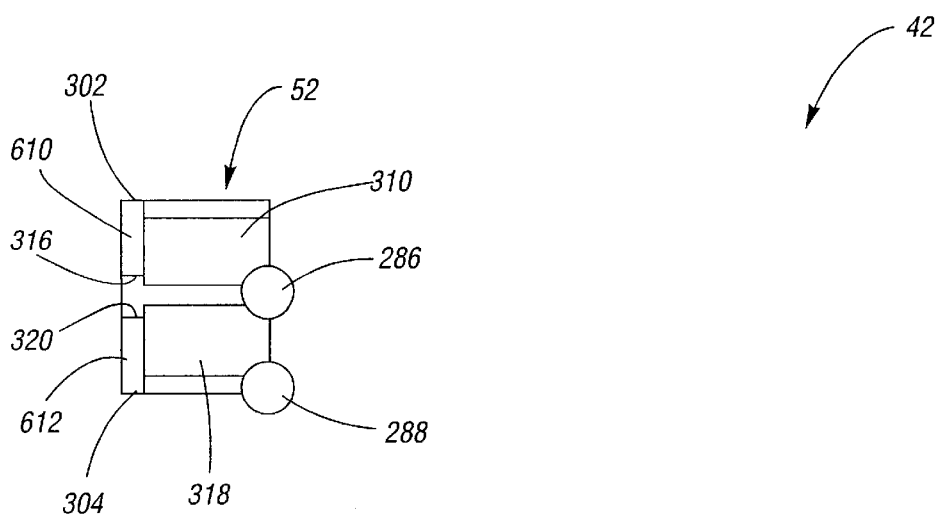
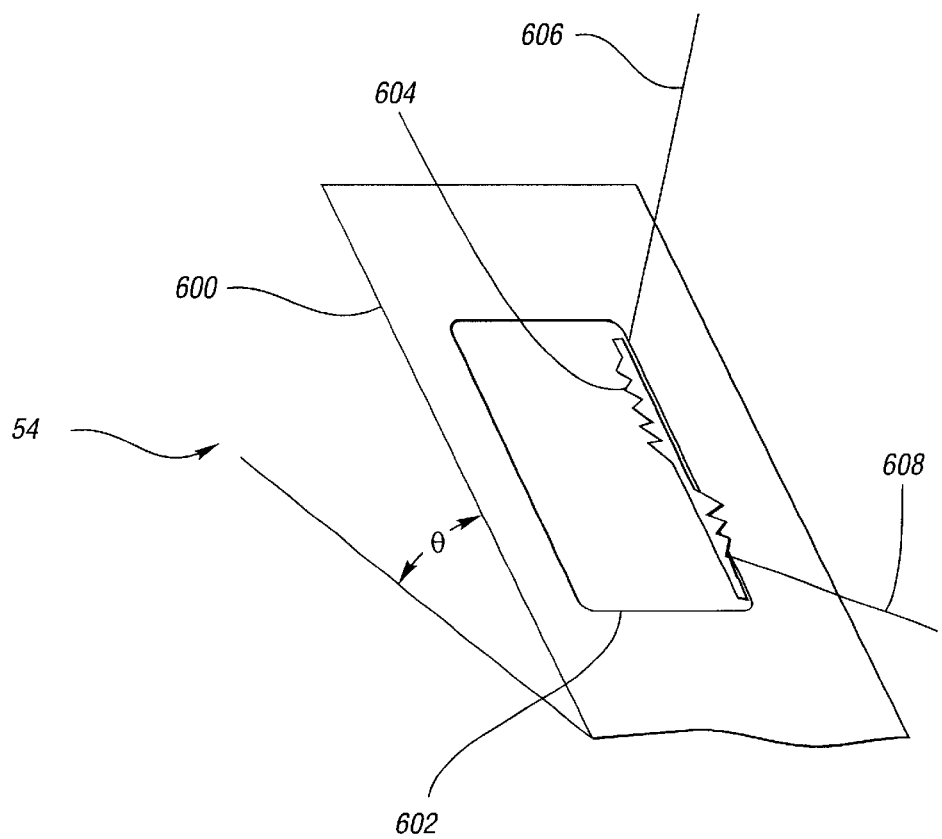
Fig. 20

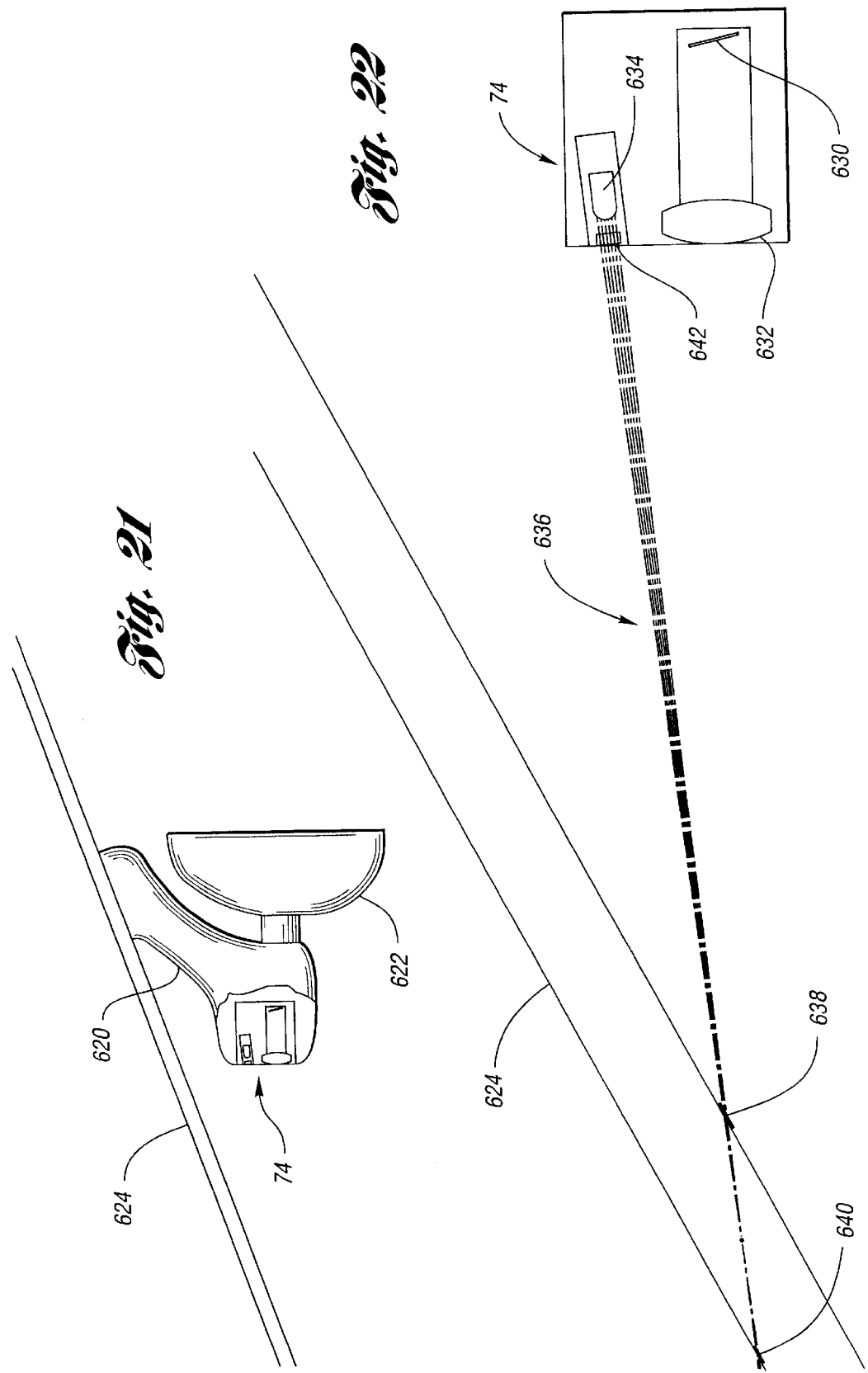

CONTINUOUSLY VARIABLE HEADLAMP CONTROL

CROSS-REFERENCE TO RELATED APPLICATIONS

This application is a continuation of U.S. patent application Ser. No. 09/546,858, entitled "CONTINUOUSLY VARIABLE HEADLAMP CONTROL," filed on Apr. 10, 2000, by Joseph S. Stam et al., now U.S. Pat. No. 6,281,632, which is a continuation of U.S. patent application Ser. No. 09/157,063, entitled "CONTINUOUSLY VARIABLE HEADLAMP CONTROL," filed on Sep. 18, 1998, on behalf of Joseph S. Stam et al., now U.S. Pat. No. 6,049,171. The entire disclosure of each of the above-noted applications is incorporated herein by reference.

BACKGROUND OF THE INVENTION

The present invention relates to automatically controlling continuously variable headlamps to prevent excessive glare seen by drivers in front of the headlamps.

Recently, headlamps producing a continuously variable illumination range have become available. The illumination range may be varied by one or both of changing the intensity of light and changing the direction of light emitted by the headlamps.

Varying headlamp illumination intensity can be accomplished in several different means. A first means is to provide a pulse-width modulated (PWM) signal to the headlamp. By varying the duty cycle of headlamp power, the headlamp illumination intensity can be increased or decreased. This may be accomplished by providing a PWM signal from a control system to a high power field effect transistor (FET) in series with the headlamp bulb.

Another means of varying the power duty cycle of a headlamp is to provide a PWM signal to a lamp driver integrated circuit such as a Motorola MC33286. This integrated circuit provides the added advantage of limiting the maximum inrush current to the headlamp, thus potentially extending the life of the headlamp bulb.

Yet another means of varying headlamp illumination uses high intensity discharge (HID) headlamps. HID lamps are a new, highly efficient headlamp technology. The ballasts used to power HID headlamps can be directly supplied with a control signal to vary headlamp illumination intensity.

Still another means to vary the illumination intensity of a headlamp is to provide an attenuating filter to absorb some of the light emitted from the headlamp. An electrochromic filter may be placed in front of the headlamp. By controlling the voltage applied to the electrochromic filter, the amount of light absorbed and, hence, the emitted illumination level, can be varied.

There are also several means available for changing the direction of light emitted from headlamps. Headlamp aim can be varied using actuators to move the headlamp housing relative to the vehicle. Typically, these actuators are electric motors such as stepper motors.

For headlamps with appropriately designed reflectors, mechanically moving the light source relative to the reflector can change headlamp beam direction as well as headlamp illumination intensity.

HID headlamps provide several additional methods of aiming the headlamp beam. Some of these methods involve deflecting or perturbing the arc in such a way as to vary the lamp output. U.S. Pat. No. 5,508,592 entitled "METHOD FOR DEFLECTING THE ARC OF AN ELECTRODE-LESS HID LAMP" to W. Lapatovich et al., which is hereby incorporated by reference, describes exciting the HID lamp with a high-frequency radio signal. Modulating the signal causes the lamp to operate at an acoustic resonance point, perturbing the arc from its quiescent position. An alternative technique, known as magnetodynamic positioning (MDP), uses a magnetic field to shape the HID arc. MDP is being developed by Osram Sylvania Inc. of Danvers, Mass.

A collection of methods for implementing continuously variable headlamps is described in Society of Automotive Engineers (SAE) publication SP-1323 entitled "Automotive Lighting Technology," which is hereby incorporated by reference.

Automatic control of continuously variable headlamps offers several potential benefits over automatic control of traditional on-off headlamps. Greater flexibility for illumination is available, allowing headlamp illumination to be better adapted to driving conditions. Also, continuously varying the headlamp illumination does not create rapid changes in illumination that may startle the driver. Various methods have been devised to control both continuously variable and conventional discrete headlamps. One of the oldest methods is to aim the headlamp in the same direction as steered wheels. Another method increases the illumination range in proportion to increasing vehicle speed.

Still another method of controlling headlamps has been developed for HID lamps. The increased brightness and bluish color of the HID lamps is particularly disrupting to oncoming drivers. Due to this disruptness effect, certain European countries require headlamp leveling systems if HID lamps are used on a vehicle. These headlamp leveling systems detect the pitch of the vehicle relative to the road and adjust the vertical aim of the headlamps accordingly. Advanced systems further use the speed of the vehicle to anticipate small pitch disturbances caused by acceleration.

One problem with current continuously variable headlamp control systems is the inability to consider oncoming or leading vehicles in determining the illumination range of headlamps. One prior art device is expressed in U.S. Pat. No. 4,967,319 entitled "HEADLIGHT APPARATUS FOR AUTOMOTIVE VEHICLE" by Y. Seko. This device utilizes vehicle speed along with the output from a five-element linear optical sensor array directly coupled to a headlamp. The headlamp incorporates motor drives to adjust the elevational angle of illumination beams. This design requires separate sensing and control system for each headlamp or suggests as an alternative a controlled headlamp only on the side of the vehicle facing opposing traffic. This design presents many problems. First, the optical sensor and associated electronics are in close proximity to the hot headlamp. Second, placing the image sensor on the lower front portion of the vehicle may result in imaging surfaces being coated with dirt and debris. Third, placing the image sensor close to the headlamp beam makes the system subject to the masking effects of scattered light from fog, snow, rain, or dust particles in the air. Fourth, this system has no color discriminating capability and, with only five pixels of resolution, the imaging system is incapable of accurately determining lateral and elevational locations of headlamps or tail lights at any distance.

What is needed is control of continuously variable headlamps based on detection of oncoming headlamps and leading tail lights at distances where headlamp illumination would create excessive glare for the drivers of oncoming and leading vehicles.

SUMMARY OF THE INVENTION

The present invention may control continuously variable headlamps based on detected headlamps from oncoming vehicles and tail lights from leading vehicles. The control system may determine the proper aim of headlamps in steerable headlamp systems and may determine the proper intensity of headlamps in variable intensity headlamp systems. Gradual changes in the region of headlamp illumination may be supported. The control system also operates correctly over a wide range of ambient lighting conditions.

The headlamp control system of the present invention may determine the proper aim of headlamps in steerable headlamp systems.

The headlamp control system of the present invention may vary the intensity of headlamp beams continuously in response to detected oncoming and leading vehicles.

The headlamp control system of the present invention may operate such that the transition from high beam to low beam or from low beam to high beam is gradual and thus not startling to the vehicle driver.

The present invention also provides control of continuously variable headlamps over a wide range of ambient lighting conditions.

In carrying out the above objects and features of the present invention, a method for controlling continuously variable headlamps is provided. The method includes detecting an ambient light level. The continuously variable headlamps are set to daylight mode if the ambient light level is greater than a first threshold. The headlamps are set to low beam mode if the ambient light level is less than the first threshold but greater than a second threshold. Automatic headlamp dimming is enabled if the ambient light level is less than the second threshold.

In an embodiment of the present invention, automatic headlamp dimming includes obtaining an image in front of the headlamps. The image covers a glare area including points at which a driver in a vehicle in front of the headlamps would perceive the continuously variable headlamps as causing excessive glare if the headlamps were at full range. The image is processed to determine if the vehicle is within the glare area. If the vehicle is within the glare area, the continuously variable headlamp illumination range is reduced. Otherwise, the continuously variable headlamps are set to full illumination range. In various refinements, the continuously variable illumination range may be modified by changing the intensity of light emitted, by changing the direction of light emitted, or both.

In another embodiment of the present invention, reducing the continuously variable headlamp illumination range includes incrementally decreasing the illumination range. Obtaining the image, processing the image, and incrementally decreasing illumination range are repeated until the illumination range produces a level of illumination at the oncoming or leading vehicle position that would not be perceived as causing excessive glare by the driver in the vehicle in front of the continuously variable headlamps.

In still another embodiment of the present invention, the ambient light level is determined by a multipixel image sensor having an elevational angle relative to the controlled vehicle having continuously variable headlamps. The method includes acquiring a sequence of images, finding a stationary light source in each image, calculating a measure of elevation for the stationary light source in each image, and determining the elevational angle based on the calculated measures of elevation.

In a further embodiment of the present invention, the full illumination range is reduced if at least one form of precipitation, such as fog, rain, snow, and the like, is detected.

In a still further embodiment of the present invention, each continuously variable headlamp has an effective illumination range varied by changing vertical direction aimed. Each effective illumination range has an elevational direction corresponding to an upper extent of the headlamp beam bright portion. The method further includes acquiring a sequence of images. The elevational direction is determined for at least one continuously variable headlamp in each image of the sequence. A determination is then made as to whether or not the sequence of images was taken during travel over a relatively straight, uniform surface. If so, the determined elevational directions are averaged to obtain an estimate of actual elevational direction.

A system for controlling at least one continuously variable headlamp on a controlled vehicle is also provided. Each continuously variable headlamp has an effective illumination range varied by changing at least one parameter from a set including horizontal direction aimed, vertical direction aimed, and intensity emitted. The system includes an imaging system capable of determining lateral and elevational locations of headlamps from oncoming vehicles and tail lamps from leading vehicles. The system also includes a control unit that can acquire an image from in front of the at least one headlamp. The image covers a glare area including points at which the driver of a vehicle in front of the headlamps would perceive the headlamps as causing excessive glare. The image is processed to determine if at least one vehicle including oncoming vehicles and leading vehicles is within the glare area. If at least one vehicle is within the glare area, the headlamp illumination range is reduced. Otherwise, the headlamp illumination range is set to full illumination range.

In an embodiment of the present invention, the controlled vehicle has at least one low beam headlamp with variable intensity and at least one high beam headlamp with variable intensity. The control unit reduces the illumination range by decreasing the intensity of the high beam headlamp while increasing the intensity of the low beam headlamp.

In another embodiment of the present invention wherein headlamps produce illumination through heating at least one filament, the control unit causes a low amount of current to flow through each filament when the controlled vehicle engine is running and when the headlamp containing the filament is not controlled to emit light. The low amount of current heating the filament decreases filament brittleness thereby prolonging filament life.

In still another embodiment of the present invention, the imaging system is incorporated into the rearview mirror mount. The imaging system is aimed through a portion of the controlled vehicle windshield cleaned by a windshield wiper.

In yet another embodiment of the present invention, the controlled vehicle has a headlamp with a variable vertical aim direction. The system further includes at least one sensor for determining vehicle pitch relative to the road surface. The control unit aims the headlamp to compensate for controlled vehicle pitch variations. In a refinement, the controlled vehicle includes a speed sensor. The control unit anticipates controlled vehicle pitch changes based on changes in controlled vehicle speed.

In a further embodiment of the present invention, the controlled vehicle includes headlamps with variable horizontal aim direction. The control unit determines if a leading vehicle is in a curb lane on the opposite side of the controlled vehicle from oncoming traffic and is in the glare area. If no leading vehicle is in one of the curb lanes, headlamp illumination range is reduced by aiming the headlamps away from the direction of oncoming traffic.

In a still further embodiment of the present invention, the control unit reduces headlamp illumination range at a predetermined rate over a predetermined transition time.

A system is also provided for controlling at least one continuously variable headlamp having an effective illumination range varied by changing vertical direction aimed. Each effective illumination range has an elevational direction corresponding to an upper extent of the headlamp beam bright portion. The system includes an imaging system capable of determining lateral and elevational locations of headlamps from oncoming vehicles. The imaging system is mounted a vertical distance above each headlamp. The system also includes a control unit for acquiring an image in front of the headlamps. The image covers a glare area including points at which the driver of the oncoming vehicle would perceive the continuously variable headlamps to cause excessive glare. The image is processed to determine if at least one oncoming vehicle is within the glare area. If at least one oncoming vehicle is within the glare area, the elevational angle between the imaging system and the headlamps of each of the at least one oncoming vehicles is determined. If at least one oncoming vehicle is within the glare area, the continuously variable headlamps are aimed such that the elevational direction is substantially parallel with a line between the imaging system and the headlamps of the oncoming vehicle producing the greatest of the determined elevational angles.

A system is further provided for controlling continuously variable headlamps. The system includes at least one moisture sensor for detecting at least one form of precipitation such as fog, rain, and snow. The system also includes a control unit to reduce the headlamp full illumination range when precipitation is detected.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 7 is a schematic diagram illustrating reduction of headlamp illumination range according to an embodiment of the present invention;

FIG. 9 is an illustration of street lamp imaging according to the present invention;

FIGS. 10a and 10b are schematic diagrams of apparent street light elevational angle as a function of camera-to-vehicle inclination angle;

FIG. 20 is an ambient light sensor that may be used to implement the present invention;

FIG. 21 is a diagram illustrating mounting of a moisture sensor that may be used to implement the present invention; and FIG. 22 is a diagram illustrating operation of a moisture sensor that may be used to implement the present invention.

DETAILED DESCRIPTION OF THE PREFERRED EMBODIMENTS

Figure 1:
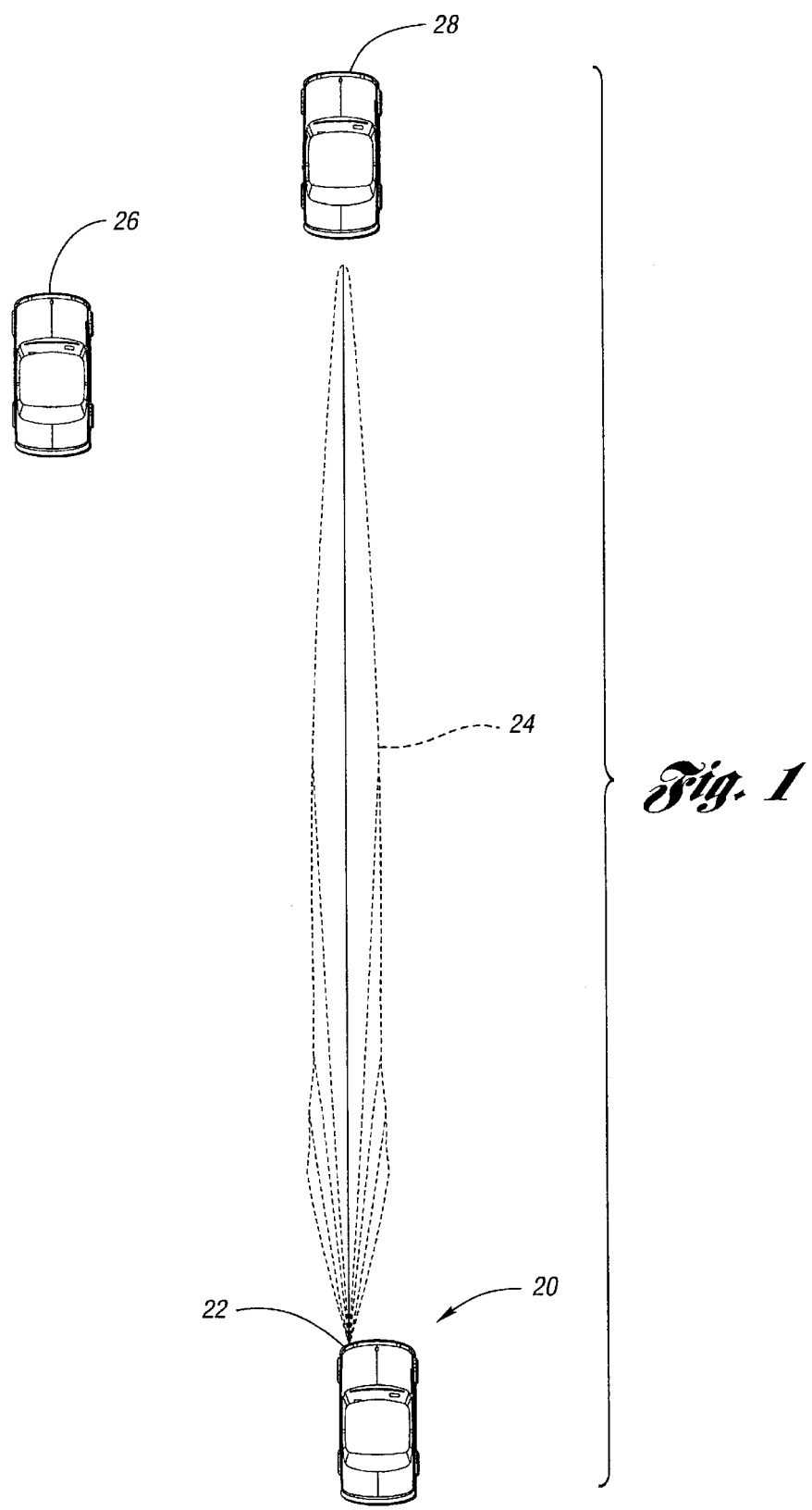
FIG. 1 is a diagram showing a continuously variable headlamp illumination range together with oncoming and leading vehicles.

Referring now to FIG. 1, a continuously variable headlamp illumination range together with oncoming and leading vehicles are shown. Controlled vehicle 20 includes at least one continuously variable headlamp 22. Each headlamp 22 produces a variable region of bright light known as illumination range 24. A driver in oncoming vehicle 26 or leading vehicle 28 that is within illumination range 24 may view headlamps as producing excessive glare. This glare may make it difficult for the driver of oncoming vehicle 26 or leading vehicle 28 to see objects on the road, to read vehicle instruments, and to readjust to night viewing conditions once vehicle 26, 28 is outside of illumination range 24. Hence, illumination range 24 is perceived as a glare area by the driver of oncoming vehicle 26 or leading vehicle 28.

The present invention attempts to reduce the level of glare seen by the driver of oncoming vehicle 26 or leading vehicle 28 by providing a control system that detects oncoming vehicle 26 or leading vehicle 28 and reduces illumination range 24 accordingly.

Figure 2:
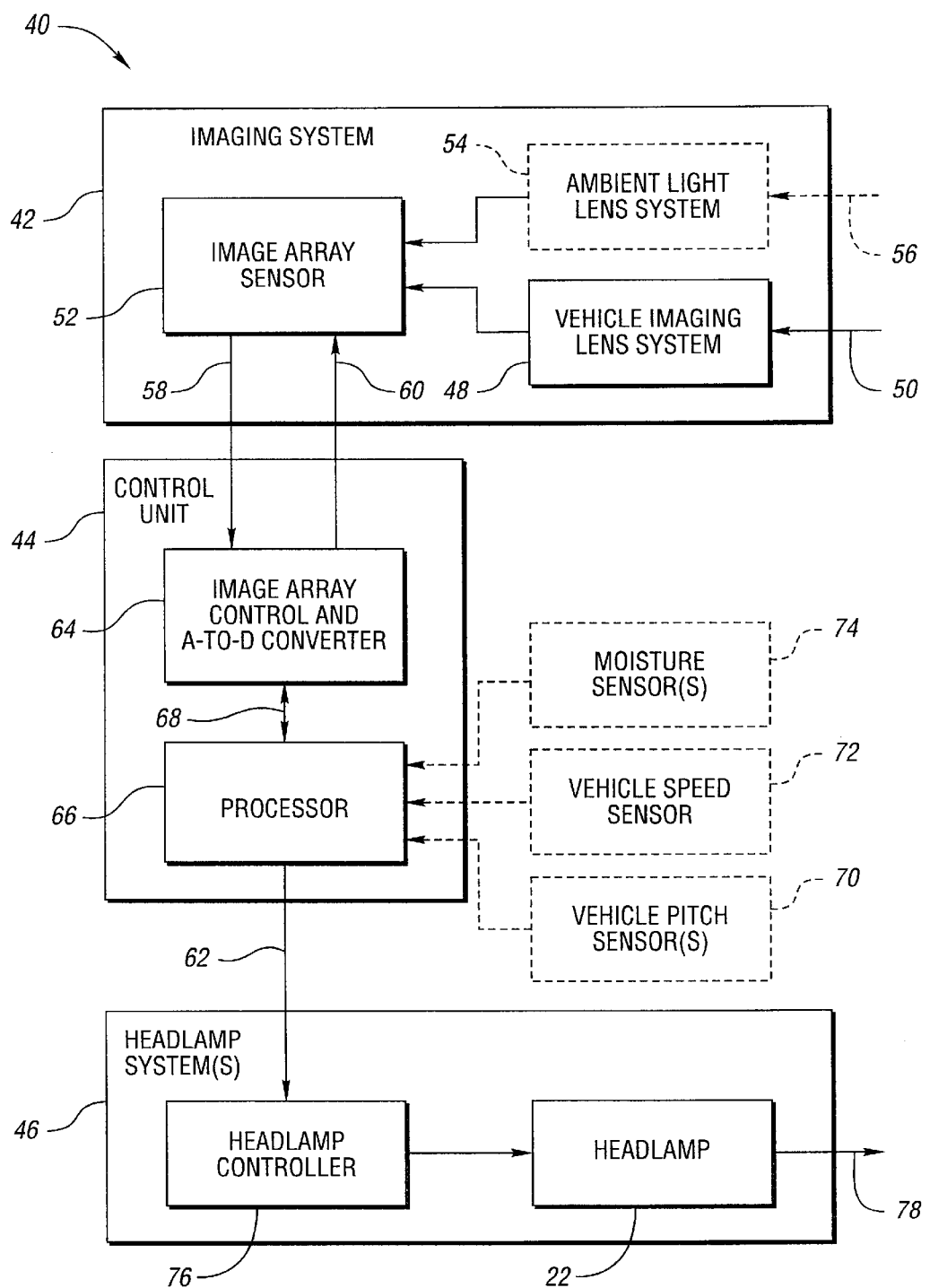
FIG. 2 is a block diagram of a control system according to an embodiment of the present invention.

Referring now to FIG. 2, a block diagram of a control system according to an embodiment of the present invention is shown. A control system for continuously variable headlamps, shown generally by 40, includes imaging system 42, control unit 44, and at least one continuously variable headlamp system 46. Imaging system 42 includes vehicle imaging lens system 48 operative to focus light 50 from a region generally in front of controlled vehicle 20 onto image array sensor 52. Imaging system 42 is capable of determining lateral and elevational locations of headlamps from oncoming vehicles 26 and leading vehicles 28. In a preferred embodiment of the present invention, vehicle imaging lens system 48 includes two lens systems, one lens system having a red filter and one lens system having a cyan filter. Lens system 48 permits image array sensor 52 to simultaneously view a red image and a cyan image of the same region in front of controlled vehicle 20. Image array sensor 52 is preferably comprised of an array of pixel sensors. Further details regarding vehicle imaging lens system 48 and image array sensor 52 are described with regards to FIGS. 14 through 16 below.

In a preferred embodiment, imaging system 42 includes ambient light lens system 54 operable to gather light 56 over a wide range of elevational angles for viewing by a portion of image array sensor 52. Ambient light lens system 54 is described with regards to FIG. 20 below. Alternatively, light 50 focused through vehicle imaging lens system 48 may be used to determine ambient light levels. Alternatively, a light sensor completely separate from imaging system 42 may be used to determine ambient light levels.

In a preferred embodiment, imaging system 42 is incorporated into the interior rearview mirror mount. Imaging system 42 is aimed through a portion of the windshield of controlled vehicle 20 cleaned by at least one windshield wiper.

Control unit 44 accepts pixel gray scale levels 58 and generates image sensor control signals 60 and headlamp illumination control signals 62. Control unit 44 includes imaging array control and analog-to-digital converter (ADC) 64 and processor 66. Processor 66 receives digitized image data from and sends control information to imaging array control and ADC 64 via serial link 68. A preferred embodiment for control unit 44 is described with regards to FIGS. 17 through 19 below.

Control system 40 may include vehicle pitch sensors 70 to detect the pitch angle of controlled vehicle 20 relative to the road surface. Typically, two vehicle pitch sensors 70 are required. Each sensor is mounted on the chassis of controlled vehicle 20 near the front or rear axle. A sensor element is fixed to the axle. As the axle moves relative to the chassis, sensor 70 measures either rotational or linear displacement. To provide additional information, control unit 44 may also be connected to vehicle speed sensor 72.

Control system 40 may include one or more moisture sensors 74. Precipitation, such as fog, rain, or snow, may cause excessive light from headlamps 22 to be reflected back to the driver of controlled vehicle 20. Precipitation may also decrease the range at which oncoming vehicles 26 and leading vehicles 28 may be detected. Input from moisture sensor 74 may therefore be used to decrease the full range of illumination range 24. A moisture sensor that may be used to implement the present invention is described with regards to FIGS. 21 and 22 below.

Each continuously variable headlamp 22 is controlled by at least one headlamp controller 76. Each headlamp controller 76 accepts headlamp illumination control signals 62 from control unit 44 and affects headlamp 22 accordingly to modify illumination range 24 of light 78 leaving headlamp 22. Depending on the type of continuously variable headlamp 22 used, headlamp controller 76 may vary the intensity of light 78 leaving headlamp 22, may vary the direction of light 78 leaving headlamp 22, or both. Examples of circuits that may be used for headlamp controller 76 are described with regards to FIGS. 17d and 17e below.

In one embodiment of the present invention, control unit 44 can acquire an image covering a glare area including points at which a driver of oncoming vehicle 26 or leading vehicle 28 would perceive headlamps 22 to cause excessive glare. Control unit 44 processes the image to determine if at least one vehicle 26, 28 is within the glare area. If at least one vehicle is within the glare area, control unit 44 reduces illumination range 24. Otherwise, headlamps 22 are set to full illumination range 24.

In a preferred embodiment of the present invention, reductions to illumination range 24 and setting headlamps 22 to full illumination range 24 occurs gradually. Sharp transitions in illumination range 24 may startle the driver of controlled vehicle 20 since the driver may not be aware of the precise switching time. A transition time of between one and two seconds is desired for returning to full illumination range 24 from dimmed illumination range 24 corresponding to low beam headlamps. Such soft transitions in illumination range 24 also allow control system 40 to recover from a false detection of oncoming vehicle 26 or leading vehicle 28. Since image acquisition time is approximately 30 ms, correction may occur without the driver of controlled vehicle 20 noticing any change.

For controlled vehicle 20 with both high beam and low beam headlamps 22, reducing illumination range 24 may be accomplished by decreasing the intensity of high beam headlamps 22 while increasing the intensity of low beam headlamps 22. Alternately, low beam headlamps can be left on continuously when ambient light levels fall below a certain threshold.

For controlled vehicle 20 with at least one headlamp 22 having a variable horizontal aimed direction, the aim of headlamp 22 may be moved away from the direction of oncoming vehicle 26 when illumination range 24 is reduced. This allows the driver of controlled vehicle 22 to better see the edge of the road, road signs, pedestrians, animals, and the like that may be on the curb side of controlled vehicle 22. In a preferred embodiment, control unit 44 may determine if any leading vehicle 28 is in a curb lane on the opposite side of controlled vehicle 20 from oncoming traffic and is in the glare area. If not, reducing illumination range 24 includes aiming headlamps 22 away from the direction of oncoming traffic. If a leading vehicle is detected in a curb lane, illumination range 24 is reduced without changing the horizontal aim of headlamps 22.

Figure 3:
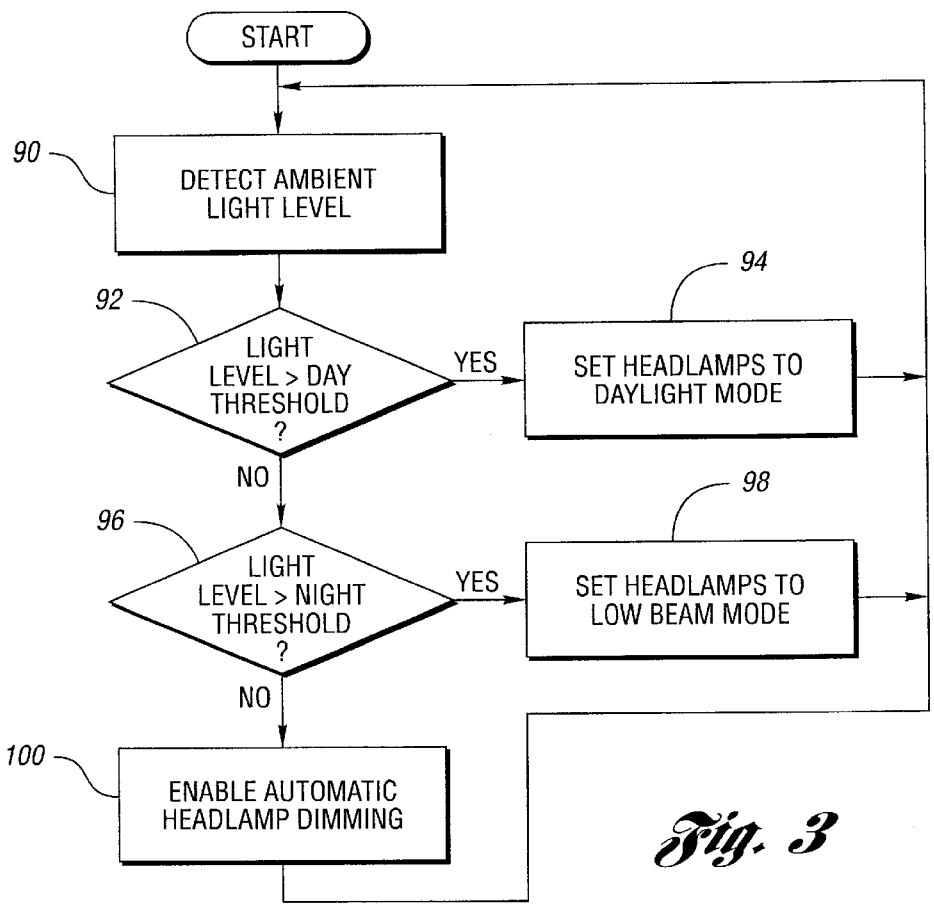
FIG. 3 is a flow diagram of a method for controlling continuously variable headlamps in different ambient lighting conditions according to the present invention.

Referring now to FIG. 3, a flow diagram of a method for controlling continuously variable headlamps in different ambient lighting conditions according to the present invention is shown. For FIG. 3 and for each additional flow diagram shown, operations are not necessarily sequential operations. Similarly, operations may be performed by software, hardware, or a combination of both. The present invention transcends any particular implementation and aspects are shown in sequential flow chart form for ease of illustration.

During twilight, different drivers or automated headlamp systems will turn on headlamps and running lights at different times. Since the present invention relies on detecting headlamps of oncoming vehicles 26 and tail lamps of leading vehicles 28, there may be a period of time between when controlled vehicle 20 has headlamps turned on and when vehicles 26, 28 can be detected. To accommodate various ambient light conditions at which headlamps and tail lamps of vehicles 26, 28 may be turned on, an embodiment of the present invention uses two thresholds for system operation.

The ambient light level is detected in block 90. In block 92, the ambient light level is compared to a day threshold. When the ambient light level is greater than the day threshold, headlamps are set to daylight mode in block 94. Daylight mode may include turning on daylight running lamps (DRLs).

In an embodiment of the present invention wherein the controlled vehicle includes headlamps, such as continuously variable headlamps 22, which produce illumination by heating at least one filament, the effective filament life may be extended by causing a low amount of current to flow through the element when the headlamp is not controlled to emit light. The amount of current is large enough to heat the filament without causing the filament to emit light. This heating makes the filament less brittle and, hence, less susceptible to shock and vibration damage.

When ambient light levels fall below the day threshold, the ambient light level is compared to the night threshold in block 96. If the ambient light level is less than the day threshold but greater than the night threshold, headlamps are set to low beam mode in block 98. In low beam mode, either standard low beam headlamps may be turned on or continuously variable headlamps 22 may be set to an illumination range 24 corresponding to a low beam pattern. Running lights including tail lamps may also be turned on.

When ambient light levels fall below the night threshold level, automatic headlamp dimming is enabled in block 100. During automatic headlamp dimming mode, control unit 44 acquires an image in front of headlamps 22. The image covers the glare area including points at which the drivers of oncoming vehicles 26 or leading vehicles 28 would perceive headlamps 22 to cause excessive glare. Control unit 44 processes the image to determine if any vehicles 26, 28 are within the glare area. If at least one vehicle 26, 28 is within the glare area, control unit 44 reduces headlamp illumination range 24. Otherwise, headlamp illumination range 24 is set to full illumination range.

Several benefits, in addition to reducing glare seen by drivers of oncoming vehicles 26 and leading vehicles 28, are achieved by the present invention. Studies have shown that many drivers rarely use high beams either out of fear of forgetting to dim the high beams, out of unfamiliarity with high beam controls, or due to preoccupation with other aspects of driving. By automatically providing the full range of illumination when oncoming vehicles 26 and leading vehicles 28 are not present, the driver of controlled vehicle 20 will experience greater visibility.

Another benefit achieved by the present invention is the ability to illuminate areas in front of controlled vehicle 20 currently not legally permitted.

Current limitations on high beam aiming are based, in part, on not completely blinding the drivers of oncoming vehicles 26 if the high beams are not dimmed. Using control system 40, illumination range 24 may be expanded to better illuminate overhead and roadside signs, greatly aiding in night navigation. Because the present invention automatically decreases illumination range 24 due to an approaching oncoming vehicle 26 or leading vehicle 28, the risk of temporarily blinding the driver of vehicles 26, 28 is greatly reduced.

Figure 4:
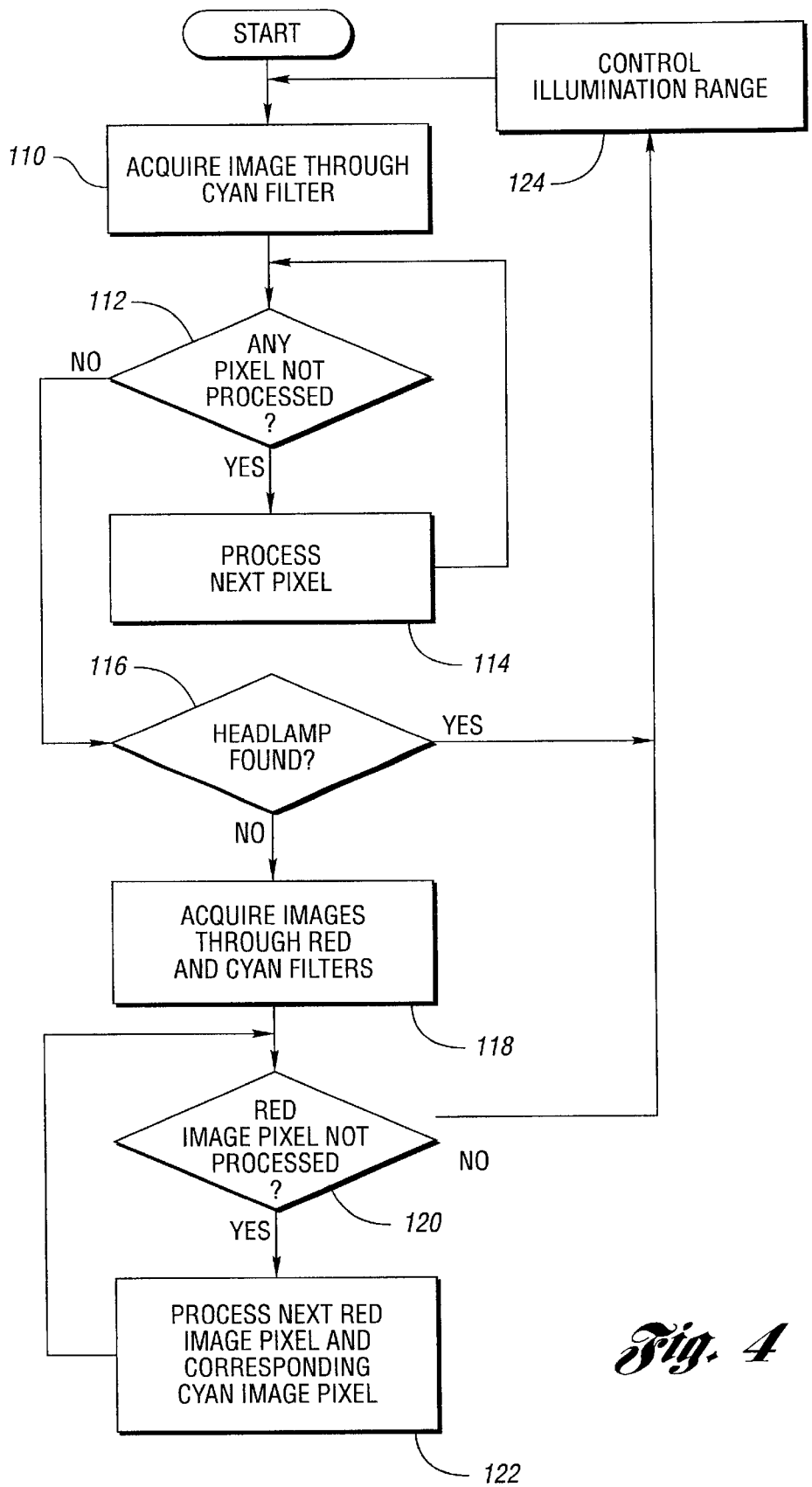
FIG. 4 is a flow diagram of automatic headlamp dimming according to the present invention.
Figure 5:
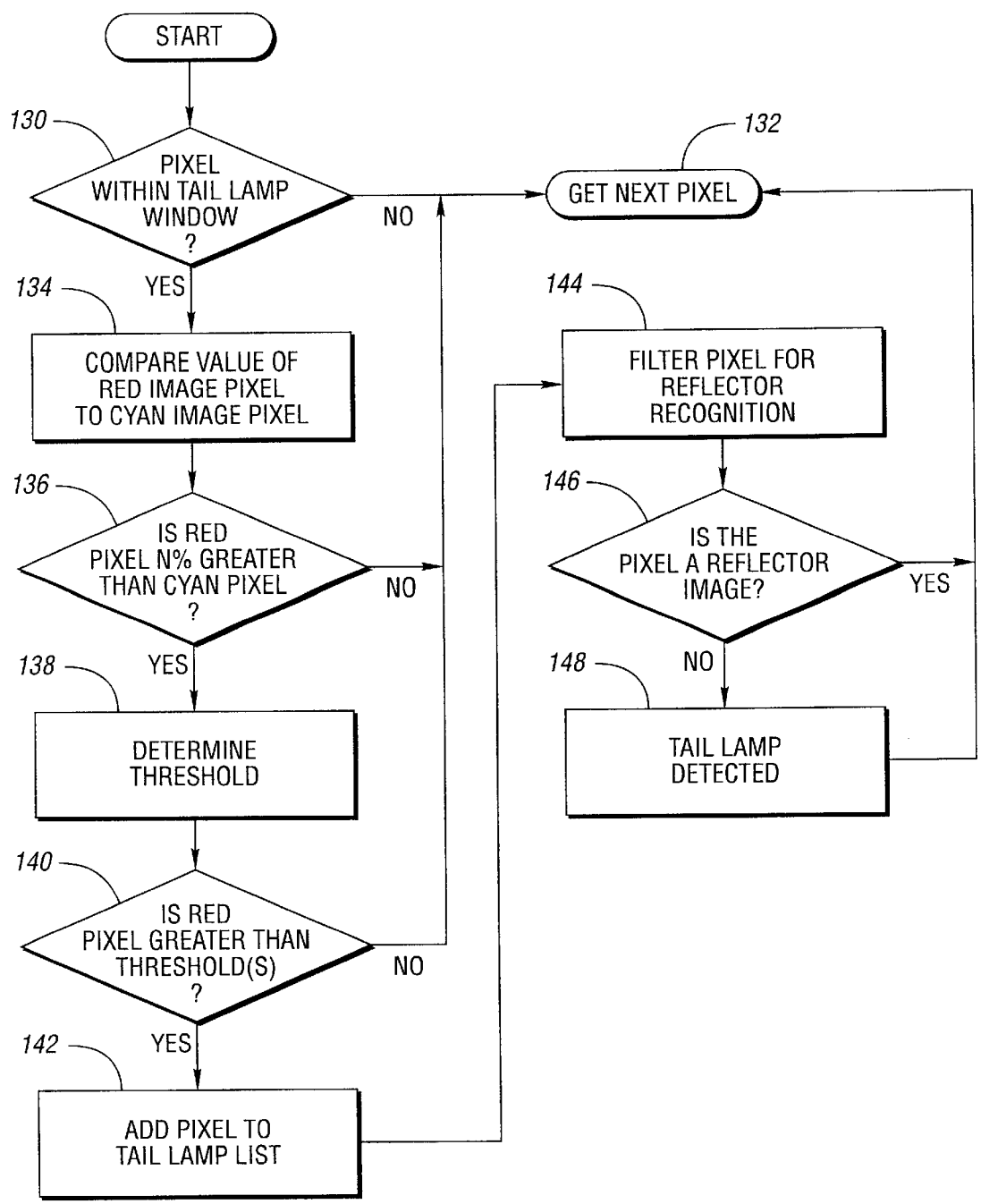
FIG. 5 is a flow chart of a method for detecting tail lamps according to an embodiment of the present invention.
Figure 6:
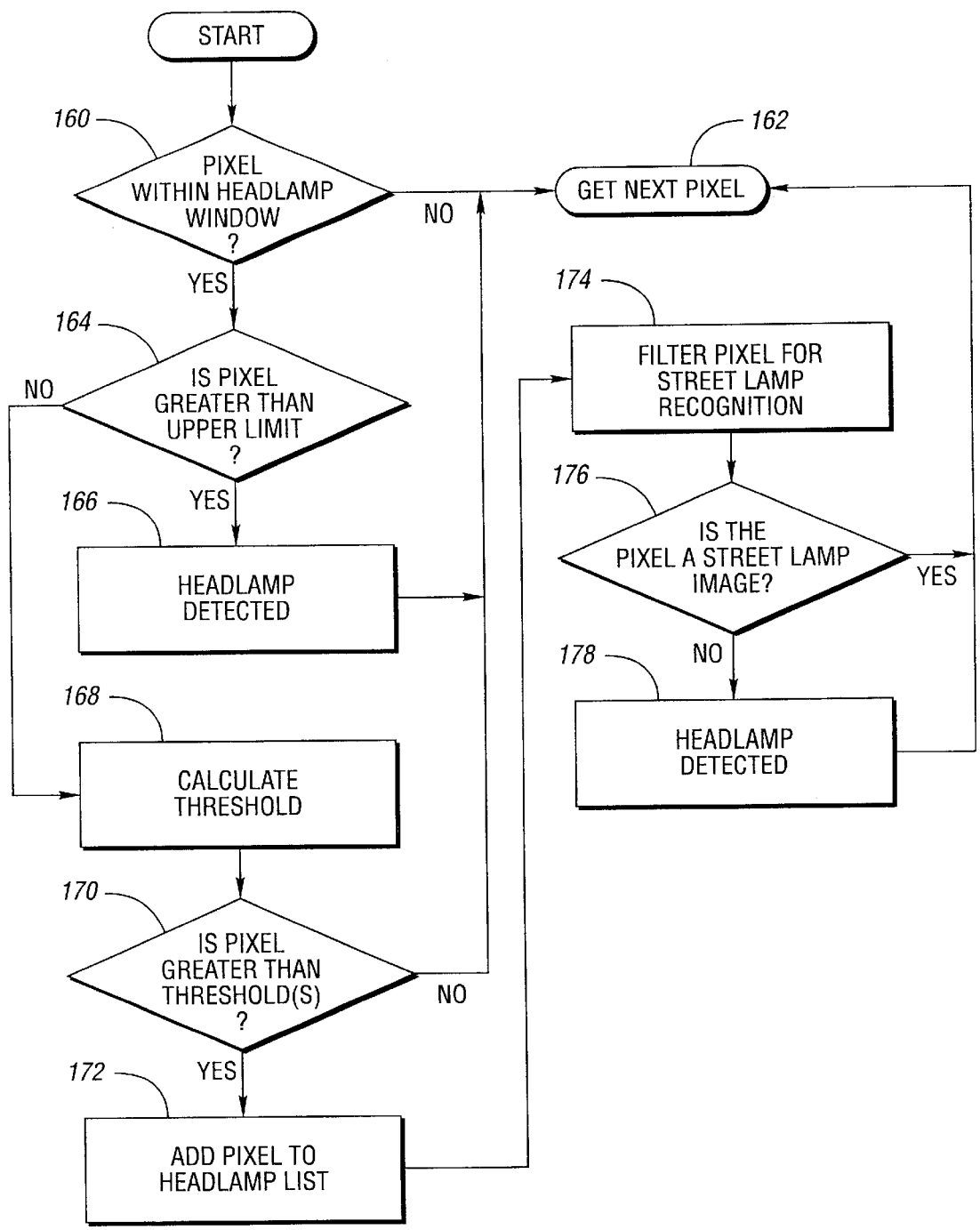
FIG. 6 is a flow chart of a method for detecting headlamps according to an embodiment of the present invention.

Referring now to FIG. 4, a flow diagram of automatic headlamp dimming according to the present invention is shown. The methods described in FIGS. 4 through 6 are more fully described in U.S. Pat. No. 5,837,994 entitled "CONTROL SYSTEM TO AUTOMATICALLY DIM VEHICLE HEAD LAMPS" by Joseph S. Stam et al., the entire disclosure of which is hereby incorporated by reference.

Control unit 44 is used to acquire and examine images obtained through imaging system 42 to detect the presence of vehicles 26, 28. An image is acquired through the cyan filter in block 110. A loop, governed by block 112, selects the next pixel to be processed. The next pixel is processed in block 114 to detect the presence of headlamps. A method for detecting the presence of headlamps is described with regards to FIG. 6 below. A check is made to determine if any headlamps for oncoming vehicles 26 are found in block 116. Generally, headlamps of oncoming vehicles 26 appear much brighter than tail lamps of leading vehicles 28. Hence, the gain for images used to search for tail lamps is greater than the gain used to search for headlamp images. Therefore, headlamps of oncoming vehicles 26 appearing in an image used to search for tail lamps may wash out the image. If no headlamps are found, images are acquired through cyan and red filters in block 118. A loop, governed by block 120, is used to select each image pixel through the red filter and corresponding image pixel through the cyan filter. Each red image pixel and corresponding cyan image pixel are processed in block 122 to detect the presence of tail lamps. A method that may be used to detect tail lamps using red and cyan image pixels is described with regards to FIG. 5 below. Once the check for headlamps is completed and, if no headlamps are detected, the check for tail lamps is completed, the illumination range is controlled in block 124. Various alternatives for controlling illumination range 24 of continuously variable headlamps 22 are described with regards to FIGS. 2 and 3 above and to FIGS. 7 through 13 below.

Alternatives to the method shown in FIG. 4 are possible. For example, the image obtained through the cyan filter in block 110 may be used as the image obtained through the cyan filter in block 116.

Referring now to FIG. 5, a flow chart of a method for detecting tail lamps according to an embodiment of the present invention is shown. Pixels in image array sensor 52 that image light 50 through the red filter in vehicle imaging lens system 48 are examined.

The location of each pixel within image array sensor 52 is first determined to be within the tail lamp window in block 130. In a preferred embodiment of the present invention, image array sensor 52 contains more pixels than are necessary to acquire an image through the red and cyan filters having sufficient resolution. These additional pixels can be used to compensate for imperfections in aiming imaging system 42 relative to controlled vehicle 20. By including additional rows and columns of pixels, rows and columns of pixels on the edge of image array sensor 52 may be disregarded to compensate for aiming variations. Methods for aiming imaging system 42 relative to controlled vehicle 20 will be described with regards to FIGS. 9 through 13 below. If the pixel is not determined to be within the tail lamp window, the flow diagram is exited and the next pixel is selected for examination as in block 132.

If the pixel selected from the red image is within the tail lamp window, the value of the pixel is compared to the corresponding pixel from the cyan image in block 134. A decision is made in block 136 based on the comparison. If the red pixel is not N% greater than the cyan pixel, the next red pixel is determined as in block 132. Several criteria may be used to determine the value of N. N may be fixed. N may also be derived from the ambient light level. N may further be based on the spatial location of the examined pixel. Distant leading vehicle 28 in front of controlled vehicle 20 may be subjected to illumination 24 at full range intensity. Thus, a lower value for N may be used for pixels directly in front of controlled vehicle 20 while a higher value for N may be used for pixels corresponding to areas not directly in front of controlled vehicle 20.

Once the examined pixel is determined to be sufficiently red, one or more brightness thresholds are determined in block 138. The intensity of the red pixel is then compared to the one or more thresholds in block 140. If the examined red pixel is not sufficiently bright enough, the next pixel to be examined is determined as in block 132. The one or more thresholds may be based on a variety of factors. A threshold may be based on the average illumination level of surrounding pixels. It may also be based on settings for image array sensor 52 and ADC 64. The average pixel intensity over the entire image may also be used to set a threshold. As in the case of N, the threshold may also be determined by the pixel spatial location. For example, the threshold for pixels outside of 6° right and left of center should correspond to a light level incident on image array sensor 52 of about 12 times as bright as the threshold of red light directly in front of controlled vehicle 20 and pixels between a 3° and 6° lateral angle should have a light level about 4 times as bright as a pixel imaged in front of controlled vehicle 20. Such spatial varying thresholds help to eliminate false tail lamp detection caused by red reflectors along the side of the road.

Once the examined pixel is determined to be sufficiently red and determined to have a sufficient illumination level, the pixel is added to a tail lamp list in block 142. Pixels are filtered for reflector recognition in block 144. The position of each pixel in the tail lamp list is compared to the position of pixels in the tail lamp lists from previous images to determine if the pixels represent tail lamps or roadside reflectors. Several techniques may be used. First, rapid rightward motion of a pixel over several frames is a strong indication that the pixels are imaging a stationary reflector. Also, since the speed at which controlled vehicle 20 overtakes leading vehicle 28 is much less than the speed at which controlled vehicle 20 would overtake a stationary reflector, the rate of increase in brightness of pixels would be typically much greater for a stationary reflector than for tail lamps on leading vehicle 28. A decision is made in block 46 to determine if the pixel is a reflector image. If not, a determination is made that a tail lamp has been detected in block 148.

Referring now to FIG. 6, a flow chart of a method for detecting headlamps according to an embodiment of the present invention is shown. A pixel from image array sensor 52 is selected from a region viewing light 50 through vehicle image lens system 48 having a cyan filter. The pixel to be examined is first checked to determine if the pixel is within the headlamp window in block 160. As in block 130 in FIG. 5 above, block 160 permits corrections in the aiming of imaging system 42 by not using all rows and columns of image array sensor 52. If the examined pixel is not within the headlamp window, the flow chart is exited and the next pixel is obtained as in block 162.

A check is made in block 164 to determine if the examined pixel is greater than an upper limit. If so, a determination is made that a headlamp has been detected in block 166 and the flow chart is exited. The upper limit used may be a fixed value, may be based on the ambient light level, and may also be based on the spatial location of the examined pixel.

If the upper limit in intensity is not exceeded, one or more thresholds are calculated in block 168. A comparison is made in block 170 to determine if the intensity of the examined pixel is greater than at least one threshold. If not, the next pixel to be examined is determined in block 162. As in block 138 in FIG. 5 above, the one or more thresholds may be determined based on a variety of factors. The ambient light level may be used. Also, the average intensity of pixels surrounding the examined pixel may be used. Further, the vertical and horizontal spatial location of the examined pixel may be used to determine the threshold.

If the examined pixel is greater than at least one threshold, the pixel is added to the headlamp list in block 172. Each pixel in the headlamp list is filtered for recognition as a street lamp in block 174. One filtering method that may be used is to examine a sequence of pixels in successive frames corresponding to a potential headlamp. If this light source exhibits alternating current (AC) modulation, the light source is deemed to be a street lamp and not a headlamp. Another method that may be used is the relative position of the light source in question from frame to frame. If the light source exhibits rapid vertical movement, it may be deemed a street lamp. A determination is made in block 176 as to whether or not the light source is a street lamp. If the light source is not a street lamp, a decision is made that a headlamp has been detected in block 178.

Referring to FIG. 7, a schematic diagram illustrating reducing headlamp illumination range according to an embodiment of the present invention is shown. Controlled vehicle 20 has continuously variable headlamp 22 with adjustable elevational aim. Imaging system 42 is mounted in the rearview mirror mounting bracket and aimed to look through the windshield of controlled vehicle 20. In this position, imaging system 42 is approximately 0.5 meters above the plane of continuously variable headlamps 22. When oncoming vehicle 26 is detected, an angle is calculated between the direction of vehicle forward motion 190 and the headlamps of oncoming vehicle 26. This inclination angle 192 is used to aim continuously variable headlamps 22. The elevational direction of the upper extent of illumination range 24, indicated by 194, is set to be approximately parallel with a line from imaging system 42 to the headlamps of oncoming vehicle 26. This places beam upper extent 194 approximately 0.5 meters below the headlamps of oncoming vehicle 26, thereby providing aiming tolerance, lighting the road nearly to oncoming vehicle 26, and avoiding striking the eyes of the driver of oncoming vehicle 26. If multiple vehicles 26 are detected, beam upper extent 194 is set to be substantially parallel with the greatest of the determined elevational angles 192.

In an embodiment, the adjustment range of continuously variable headlamps 22 may be restricted, particularly when angle 192 is substantially above or below a normal level. When one or more vehicle pitch sensors 70 are also used, control system 40 may base the aiming of headlamps 22 on output from imaging system 42 when lamps of oncoming vehicles 26 or leading vehicles 28 have been located and leveling control may be used otherwise. In yet another embodiment, input from vehicle pitch sensors 70 may be used to calculate a limit on how high to set beam upper extent 194 to keep the beam elevation within regulated ranges. Inputs from vehicle speed sensor 72 may be used to anticipate acceleration of controlled vehicle 20 to maintain the proper inclination for beam upper extent 194.

Figure 8:
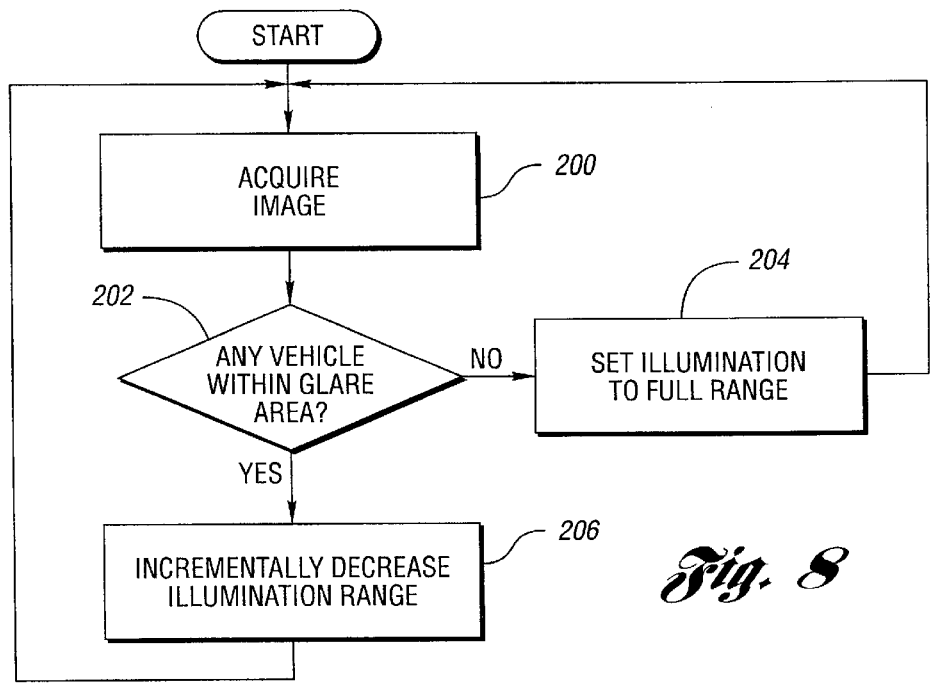
FIG. 8 is a flow diagram of an alternative method for reducing headlamp illumination range according to the present invention.

Referring now to FIG. 8, a flow diagram of an alternative method for reducing headlamp illumination range according to the present invention is shown. An image is acquired in block 200 and a determination is made to see if any vehicle is within the glare area in block 202. Techniques for determining the presence of oncoming vehicle 26 or leading vehicle 28 have been described with regards to FIGS. 4 through 6 above. If no vehicle is detected, the illumination range is set to full range in block 204.

If a vehicle is detected within the glare area, the illumination range is decreased incrementally in block 206. This results in illumination range 24 being decreased at a predetermined rate over a predetermined transition time. Several techniques are available for decreasing illumination range 24. First, the intensity of light emitted by continuously variable headlamp 22 may be decreased. Second, headlamps 22 may be aimed downward. Third, headlamps 22 may be aimed horizontally away from the direction of oncoming vehicle 26. In a refinement of the last option, a check is made to determine if any leading vehicles 28 are in curb lanes on the opposite side of controlled vehicle 20 from oncoming vehicle 26. If any leading vehicles 28 are detected, continuously variable headlamps 22 are not aimed toward the curb lane. The rate at which illumination range 24 is decreased may be constant or may be a function of parameters including the current inclination angle of continuously variable headlamps 22, the estimated range of oncoming vehicle 26 or leading vehicle 28, ambient light levels, and the like.

Depending on the automatic headlamp dimming technique used, precise measurements of camera-to-vehicle and headlamp-to-camera angles may be required. Concerning the latter, the difference between the direction that control system 40 commands of the beam of continuously variable headlamp 22 versus the actual direction of the beam of headlamp 22 relative to imaging system 42 is a critical system parameter. For example, low beams are designed to provide a very sharp transition from a relatively strong beam with beam upper extent 194 projected about 1.5° downward to a greatly diminished intensity which is normally viewed by drivers of vehicles 26, 28 in the path of the beams. Thus, errors of 0.5° particularly in the elevational direction, are significant. Errors of 2° are likely to subject drivers of vehicles 26, 28 to intolerable glare from direct, prolonged exposure to brighter portions of illumination range 24 as if headlamp 22 had not been dimmed at all. The position of illumination range 24 relative to imaging system 42 may be determined using control system 40.

In one embodiment, the position of illumination range 24 is sensed directly relative to the lights of oncoming vehicles 26 and leading vehicles 28 as adjustments to illumination range 24 are being made. In an alternative embodiment, illumination range 24 is momentarily delayed from returning to full range. A sequence of images is taken containing beam upper extent 194. If controlled vehicle 20 is in motion and the beam pattern stays the same in each of the sequence of images, control vehicle 20 can be assumed to be moving on a straight and level road. Beam upper extent 194 can then be determined relative to imaging system 42 by looking for a sharp transition between very bright and very dim regions in the output of image array sensor 52. The intensity of illumination range 24 may also be varied during the sequence of images to ensure that the bright-to-dim transition is actually caused by continuously variable headlamp 22. Experimentation is required to determine a reasonable minimum speed, length of time, and number of frames to obtain satisfactorily consistent measurements for a particular implementation.

A method for aiming imaging system 42 relative to controlled vehicle 20 is to precisely position controlled vehicle 20 in front of a target that can be seen by imaging system 42. This method is ideally suited to the automobile manufacturing process where aiming imaging system 42 may be incorporated with or replace current headlamp aiming. Vehicle dealerships and repair shops may be equipped with a similar targeting apparatus.

Referring now to FIGS. 9 through 13, a method for establishing the aim of imaging system 42 relative to controlled vehicle 20 that may be performed during the normal operation of controlled vehicle 20 is described. This method may be used in conjunction with the targeting method described above.

Referring now to FIG. 9, an illustration of street lamp imaging is shown. Image 220 represents an output from imaging system 42 showing how street lamp 222 might appear in a sequence of frames. By noting changes in the relative position of street lamp 222 in image 220, the vertical and horizontal aim of imaging system 42 relative to controlled vehicle 20 forward motion can be determined. For simplicity, the following discussion concentrates on determining vertical angle. This discussion can be extended to determining horizontal angle as well.

Referring now to FIGS. 10*a* and 10*b*, schematic diagrams of apparent street light elevational angle as a function of camera-to-vehicle inclination angle are shown. In FIG. 10*a*, imaging system axis 230 is aligned with vehicle forward motion direction 190. Imaging system axis 230 can be thought of as a normal to the plane of image array sensor 52. Over a sequence of images, street lamp 222 appears to be approaching imaging system 42. The angle between street lamp 222 and imaging system axis 230, shown by 232, increases linearly.

In FIG. 10*b*, imaging system 42 is not aimed in the direction of vehicle forward motion 190. In particular, vehicle forward motion direction 190 and imaging system axis 230 form inclination angle 234. Therefore, in a sequence of images, street lamp elevational angle 232 appears to increase in a non-linear fashion.

Figure 11:
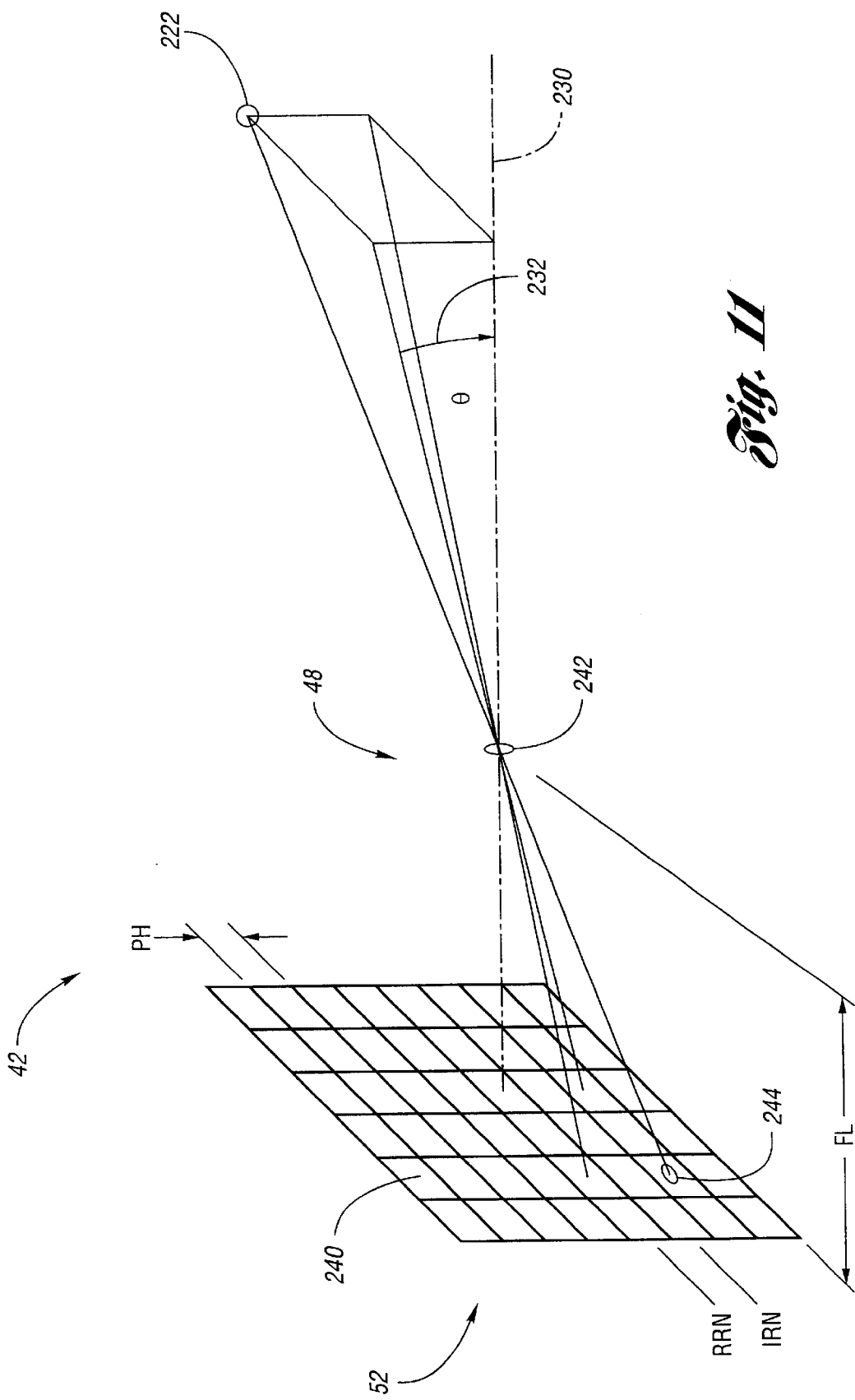
FIG. 11 is a schematic diagram illustrating street lamp elevational angle calculation according to an embodiment of the present invention.

Referring now to FIG. 11, a schematic diagram illustrating street lamp elevational angle calculation according to an embodiment of the present invention is shown. Image array sensor 52 in imaging system 42 is represented as an array of pixels, one of which is shown by 240. The number of pixels 240 shown in FIG. 11 is greatly reduced for clarity. Vehicle imaging lens system 48 is represented by single lens 242. Street lamp 222 is imaged by lens 242 onto image array sensor 52 as street lamp image 244. Street lamp elevational angle 232, shown as θ, can be calculated by equation 1:

$$\tan(\theta) = \left( \frac{IRN - RRN) \cdot PH}{FL} \right)$$

where RRN (Reference Row Number) is the row number corresponding to imaging system axis 230, IRN (Image Row Number) is the row number of street lamp image 244, PH is the row height of each pixel 240, and FL is the focal length of lens 242 relative to image array sensor 52.

Figure 12:
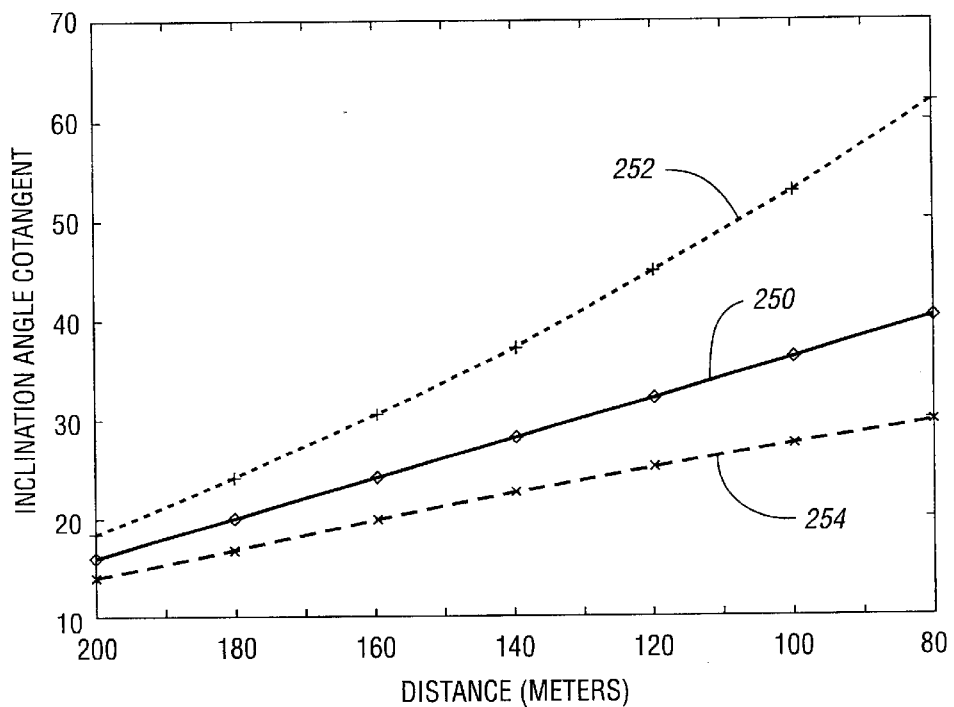
FIG. 12 is a graph illustrating street lamp elevational angles for three different camera-to-vehicle inclination angles.

Referring now to FIG. 12, a graph illustrating street lamp elevational angles for three different camera-to-vehicle inclination angles is shown. Curves 250, 252, 254 show the cotangent of the inclination angle as a function of simulated distance for street lamp 222 that is five meters high. Images are taken at 20 meter intervals from 200 to 80 meters as controlled vehicle 20 approaches street lamp 222. For curve 250, imaging system axis 230 is aligned with vehicle forward motion direction 190. For curve 252, imaging axis 230 is 0.5° above vehicle forward motion direction 190. For curve 254, imaging system axis 230 is 0.5° below vehicle forward motion direction 190. Curve 250 forms a straight line whereas curve 252 is concave upward and curve 254 is concave downward.

Figure 13:
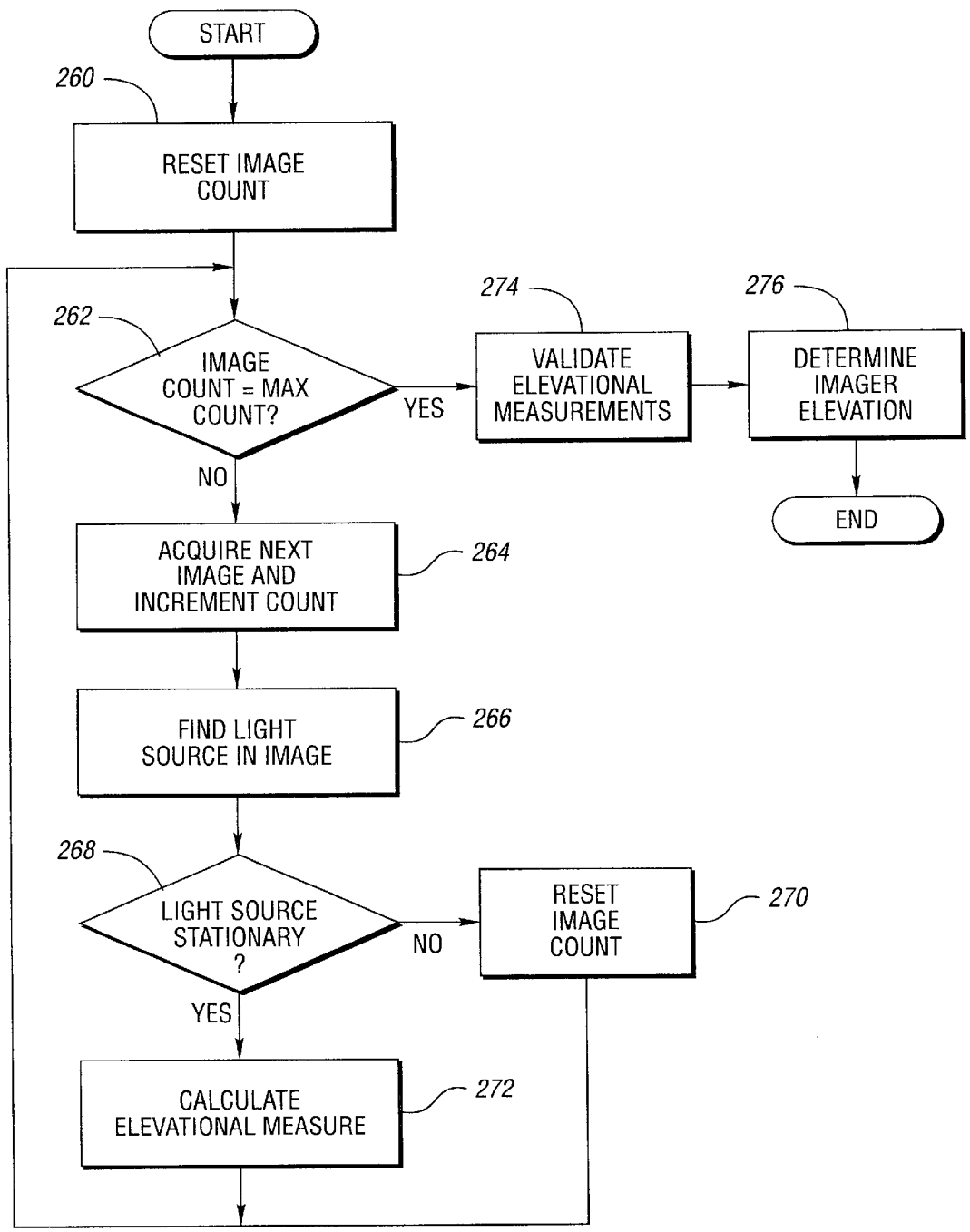
FIG. 13 is a flow diagram of a method for calculating camera-to-vehicle inclination angle according to an embodiment of the present invention.

Referring now to FIG. 13, a flow diagram of a method for calculating camera-to-vehicle inclination angle according to an embodiment of the present invention is shown. A count of the number of images taken is reset in block 260. The image count is compared to the maximum count (max count) required in block 262. The number of images required should be determined experimentally based on the type of imaging system 42 used and the configuration of imaging system 42 in controlled vehicle 22. If the image count is less than the maximum count, the next image is acquired and the image count is incremented in block 264.

A light source is found in the image in block 266. If this is the first image in a sequence or if no suitable light source has been previously found, a number of light sources may be marked for potential consideration. If a light source has been found in a previous image in the sequence, an attempt is made to find the new position of that light source. This attempt may be based on searching pixels in the last known location of the light source and, if a sequence of positions is known, may be based on extrapolating from the sequence of light source images to predict the next location of the light source.

A check is made to determine if the light source is stationary in block 268. One check is to determine if the light source exhibits AC modulation by examining light source intensity over successive images. Another check is to track the relative position of the light source in the sequence of images. If the light source is not stationary, the image count is reset in block 270. If the light source is stationary, an elevational measure is calculated in block 272. A technique for calculating elevational angle was described with regards to FIG. 11 above.

When each image in a sequence of max count images contains a stationary light source, elevational measurements are validated in block 274. As indicated with regards to FIG. 12 above, a sequence of elevational measurements for a stationary light source, when expressed as the cotangent of the angle as a function of distance, forms either a straight line, a concave upward curve, or a concave downward curve. The sequence of elevational measurements is examined to ensure that the sequence fits one of these patterns. If not, the sequence is discarded and a new sequence is obtained.

In an embodiment of the present invention, a check is made to determine if the sequence of images was acquired during relatively steady travel at a relatively constant speed. If not, the sequence is discarded and a new sequence is obtained. Constant speed can be checked using the output of speed sensor 72. Steady travel may be checked by examining the relative positions of stationary and non-stationary light sources over a sequence of frames.

The image elevation relative to the vehicle is determined in block 276. If the sequence of elevational measurements does not form a straight line, inclination angle 234 may be estimated by adding a constant value representing the radiant value correction to each of the tangent values to arrive at a corrected tangent value. The reciprocals of the new values are taken and analyzed to determine the difference between successive values. If the difference is zero, the correction value is the tangent of inclination angle 234. If the sequence of differences is not zero, the concavity of the new sequence is determined. If the concavity direction of the new sequence is the same as the original sequence, the correction value is increased. If the concavity directions are opposite, the correction factor is decreased. A new sequence of differences is then obtained and the process is repeated.

Figure 14:
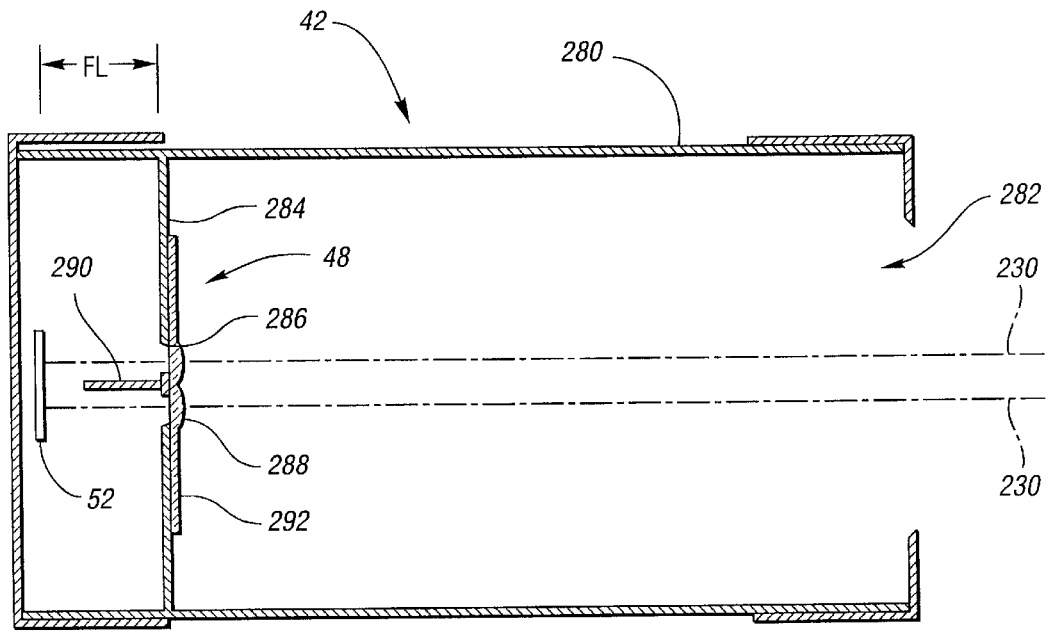
FIG. 14 is an imaging system that may be used to implement the present invention.

Referring now to FIG. 14, a cross-sectional drawing of an imaging system that may be used to implement the present invention is shown. A similar imaging system is more completely described in U.S. Pat. No. 6,130,421, entitled "IMAGING SYSTEM FOR VEHICLE HEADLAMP CONTROL" by Jon H. Bechtel et al., the entire disclosure of which is hereby incorporated by reference. Imaging system 42 includes housing 280 which holds vehicle imaging lens system 48 and image array sensor 52. Housing 280 defines aperture 282 which opens onto a scene generally in front of controlled vehicle 20. Support 284 serves to hold red lens 286 and cyan lens 288 and serves to prevent light coming through aperture 282 and not passing through a lens 286, 288 from striking image array sensor 52. As is further described with regards to FIG. 15 below, image array sensor 52 has a first region for receiving light transmitted by red lens 286 and a second, non-overlapping region for receiving light transmitted by cyan lens 288. Aperture 282, the spacing between lenses 286, 288, and baffle 290 are designed to minimize the amount of light passing through one of lens 286, 288 and striking the portion of image sensor 52 used to image light from the other of lens 286, 288.

An embodiment of lenses 286, 288 will now be described. Lenses 286, 288 may be manufactured on a single plate of polymer, such as acrylic, shown as 292. The polymer may optionally include infrared filtration, ultraviolet filtration, or both. Each lens 286, 288 is plano-convex with the forward facing surface convex and aspheric. The front surface of each lens 286, 288 may be described by equation 2:

$$Z = \frac{cr^2}{1 + \sqrt{1 - (1+k)c^2 r^2}}$$

where Z is the value of the height of the lens surface along the optical surface as a function of the radial distance r from the optical axis, c is the curvature, and k is the conic constant. For the front surface of red lens 286, c equals 0.456 $mm^{-1}$ and k equals −1.0. For the front surface of cyan lens 288, c equals 0.446 $mm^{-1}$ and k equals −1.0. Lenses 286, 288 have a diameter of 1.1 mm and have centers spaced 1.2 mm apart. At the center, each lens 286, 288 is 1.0 mm. Plate 292 is mounted to baffle 284 such that the back of each lens 286, 288 is 4.0 mm in front of image array sensor 52. This distance is indicated by focal length FL in FIG. 14. Red and cyan filters are printed onto the rear flat surfaces of red lens 286 and cyan 288, respectively, using screen, pad, or other printing techniques. The red filter substantially transmits light of wavelengths longer than 625 nm while attenuating light of wavelength shorter than 625 nm. The cyan filter substantially transmits light of wavelength shorter than 625 nm while attenuating light of wavelength longer than 625 nm. The preferable field of view afforded by lenses 286 and 288 is 10° high by 20° wide.

Figure 15:
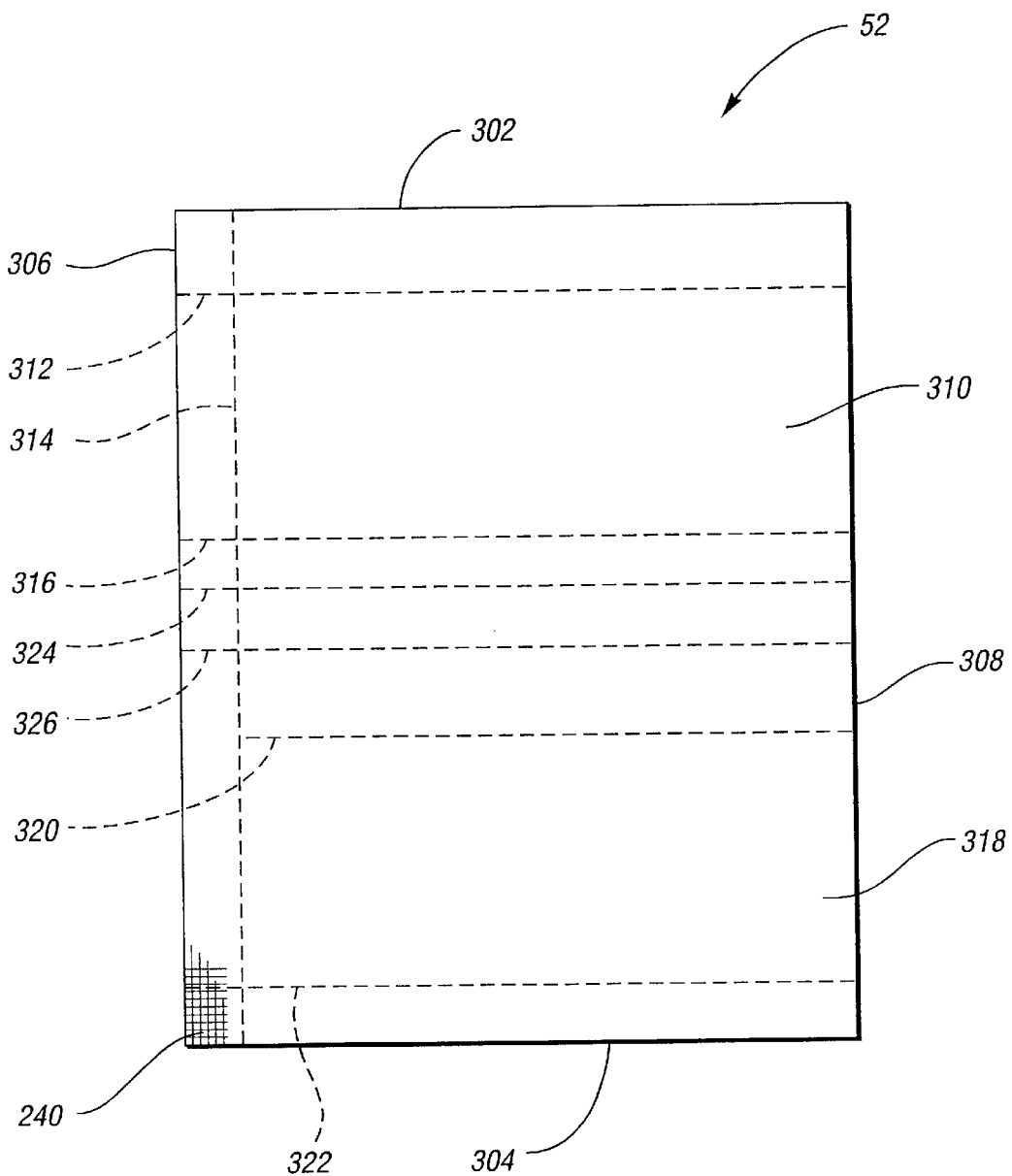
FIG. 15 is a schematic diagram of image array sensor subwindows that may be used to implement the present invention.

Referring now to FIG. 15, a schematic diagram of image array sensor subwindows that may be used to implement the present invention are shown. Image array sensor 52 includes an array of pixel sensors, one of which is indicated by 240, arranged in rows and columns. Image array sensor 52 includes top border 302, bottom border 304, left border 306, and right border 308 defining a region covered by pixel sensors 240. Image array sensor 52 is divided into several subwindows. Upper subwindow 310 is bounded by borders 308, 312, 314, and 316, and contains pixel sensors 240 struck by an image projected through red lens 286. Lower subwindow 318 is bounded by borders 308, 320, 314, and 322, and includes pixel sensors 240 onto which an image is projected through cyan lens 288.

Lenses 286, 288 provide a field of view in front of controlled vehicle 20 such as, for example, 22° wide by 9° high. A space between border 312 and top edge 302 and between borders 316 and 324 allow for an elevational adjustment to correct for misalignment of imaging system 42 in controlled vehicle 20. To accomplish the adjustment, upper subwindow 310, defined by borders 312 and 316, are moved up or down within the range between top edge 302 and border 324. Similarly, borders 320 and 322 represent boundaries for lower subwindow 318 that may be moved between bottom edge 304 and border 326. Pixel sensors 240 that lie within the region between borders 324 and 326 may receive light from both red lens 286 and cyan lens 288. Therefore, this region is not normally used as part of the active imaging area. Although only elevational adjustment has been described, lateral adjustment is also possible.

Pixel sensors 240 lying between left edge 306 and border 314 may be used for ambient light sensing. Ambient light sensing is described with regards to FIG. 20 below.

In a preferred embodiment of the present invention, image array sensor 52 includes a 256×256 array of square pixel sensors 240. In an alternative embodiment, pixel sensor 52 includes a 256×128 square array of rectangular pixels, resulting in a vertical resolution greater than the horizontal resolution.

Figure 16:
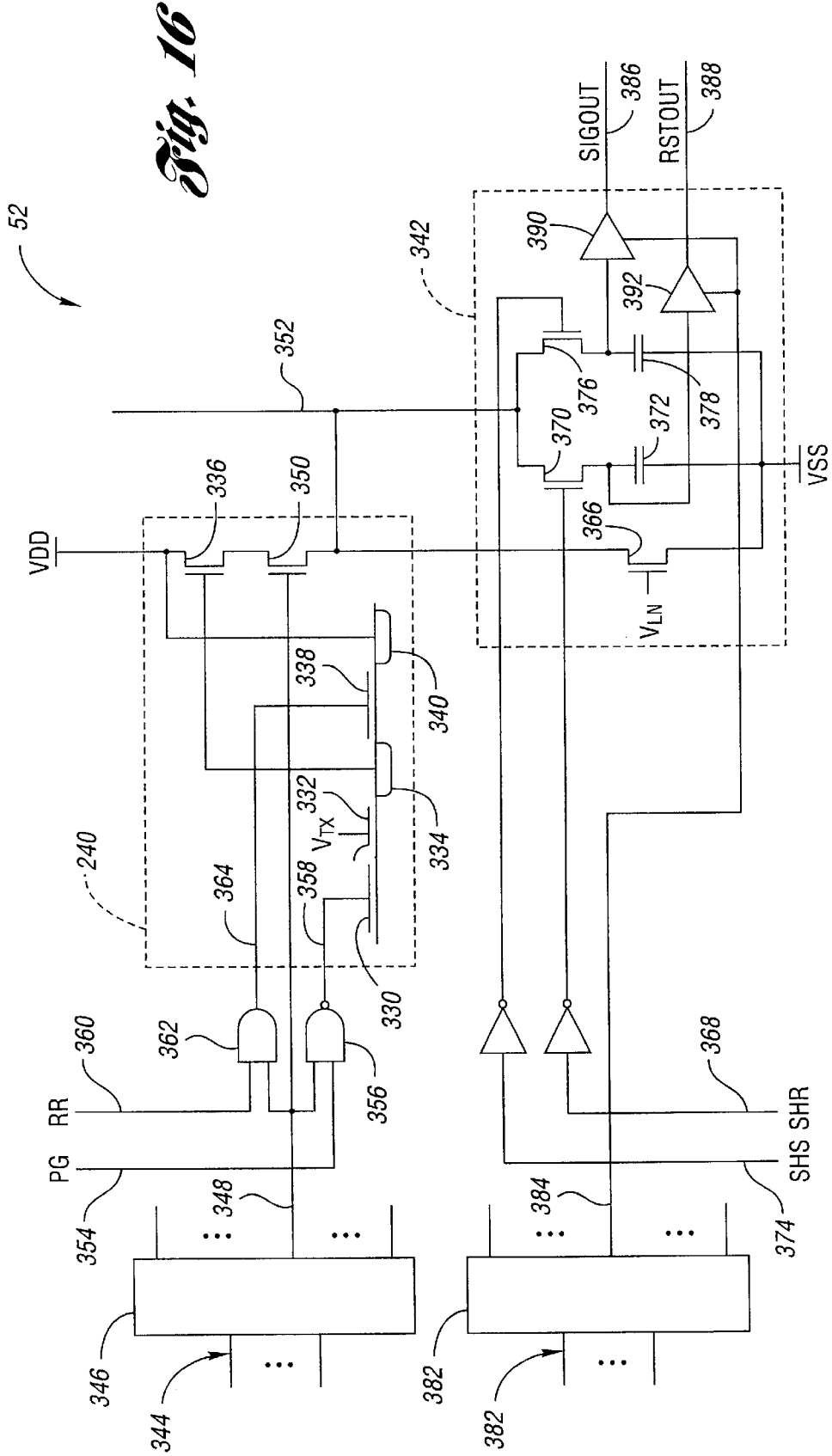
FIG. 16 is a schematic diagram of an embodiment of an image array sensor that may be used to implement the present invention.

Referring now to FIG. 16, a schematic diagram of an embodiment of an image array sensor that may be used to implement the present invention is shown. Pixel sensor 240 and the technique for correlated double sampling shown are described in U.S. Pat. No. 5,471,515 entitled "ACTIVE PIXEL SENSOR WITH INTRA-PIXEL CHARGE TRANSFER" to E. Fossum et al., which is hereby incorporated by reference. The circuitry described can be built using standard CMOS processes. Devices similar to image array sensor 52 are available from Photobit Corporation of Pasedena, Calif.

Image sensor array 52 includes an array of pixels 240. Light striking photogate transistor 330 in each pixel 240 generates electrical charge which is accumulated beneath photogate transistor 330. During charge collection, the gate of photogate transistor 330 is held at a positive voltage to create a well beneath photogate transistor 330 to hold the accumulated charge. The gate of gate electrode 332 is held at a less positive voltage, $V_{TX}$, to form a barrier to the flow of electrons accumulated beneath photogate transistor 330. In an embodiment, $V_{TX}$ is 3.8 volts relative to VSS. When charge readout is desired, the gate of photogate transistor 330 is brought to a voltage less than $V_{TX}$. The accumulated charge then flows from photogate transistor 330 through gate electrode 332 to the region beneath floating diffusion 334. Floating diffusion 334 is connected to the gate of n-channel FET 336 which has its drain connected to supply voltage VDD. Typically, VDD is 5.0 volts referenced to VSS. The gate of photogate transistor 330 is returned to its original voltage. A potential proportional to the accumulated charge can now be sensed at the source of FET 336.

During charge transfer and readout, the gate of reset electrode 338 is held at a low positive voltage to form a barrier to electrodes beneath floating diffusion 334. When the gate of reset electrode 338 is brought to a high positive voltage, charge collected beneath floating diffusion 334 is transferred through the region beneath reset electrode 338 and into drain diffusion 340 which is connected to VDD. This brings the source of FET 336 to an initial or reset potential. By subtracting this reset potential from the illumination potential proportional to accumulated charge, a great degree of fixed pattern noise may be eliminated. This technique is known as correlated double sampling.

Pixel sensors 240 are arranged in rows and columns. In a preferred embodiment, all of the pixels in a row of a selected subwindow are read simultaneously into readout circuits, one of which is indicated by 342. One readout circuit 342 exists for each column. The row to be read is selected by a row address, indicated generally by 344. Row address 344 is fed into row decoder 346 causing the row select line 348 corresponding to row address 344 to become asserted. When row select line 348 is asserted, n-channel FET 350 is turned on, allowing the potential at the source of FET 336 to appear on column readout line 352. All pixels 240 in each column are connected to a common column readout line 352. However, since each pixel in the column has a unique row address, only one row select line 348 can be asserted resulting in at most one FET 336 source potential appearing on column readout line 352.

Two control signals provide the timing for gating charge in each pixel 240. Photogate signal (PG) 354 is a high asserting signal indicating when charge is to be transferred from photogate transistor 330 to floating diffusion 334. Each row has a gate 356 which ANDs PG signal 354 and row select line 348 to produce row PG signal 358 which is connected to the gate of each photogate transistor 330 in the row. Row reset signal (RR) 360 is a high asserting signal indicating when floating diffusions 334 should be returned to the reset potential. Each row has gate 362 which ANDs RR signal 360 with the appropriate row select line 348 to produce reset signal 364 which is connected to the gate of each reset electrode 338 in the row.

Voltages at the source of FET 336 are dropped across load FET 366 when FET 350 is on. Load FET 366 is an n-channel device with a fixed gate voltage of $V_{LN}$. In this embodiment, $V_{LN}$ is approximately 1.5 volts referenced to VSS. Each pixel 240 may contain load FET 366 or, as is shown in FIG. 16, one load FET 366 may be used for each column.

Readout circuit 342 provides sample-and-hold for potentials on column readout line 352 as well as output buffering. Two input signals control each readout circuit 342. Sample-and-hold reset signal (SHR) 368 turns on n-channel FET 370 allowing the potential on column readout line 352 to charge capacitor 372. Capacitor 372 is used to store the reset potential. Sample-and-hold illumination signal (SHS) 374 turns on n-channel FET 376. This permits the potential on column readout line 352 to charge capacitor 378. Capacitor 378 is used to hold the illumination potential proportional to the charge accumulated by photogate transistor 330.

At the end of a complete readout operation, the reset potential and illumination potential from each pixel 240 in a selected row are stored in capacitors 372, 378 in each readout circuit 342. A column address, shown generally by 380, is input into decoder 382 asserting corresponding column select line 384. Each column select line 384 controls an associated readout circuit 342 to determine which readout circuit 342 will be driving common output lines SIGOUT 386 holding the illumination potential and RSTOUT 388 holding the reset potential. Buffer 390, with input connected across capacitor 378 and output connected to SIGOUT 386, and buffer 392, with input connected across capacitor 372 and output connected to RSTOUT 388 in each readout circuit 342 are enabled by the appropriate column select line 384.

Figure 17N:
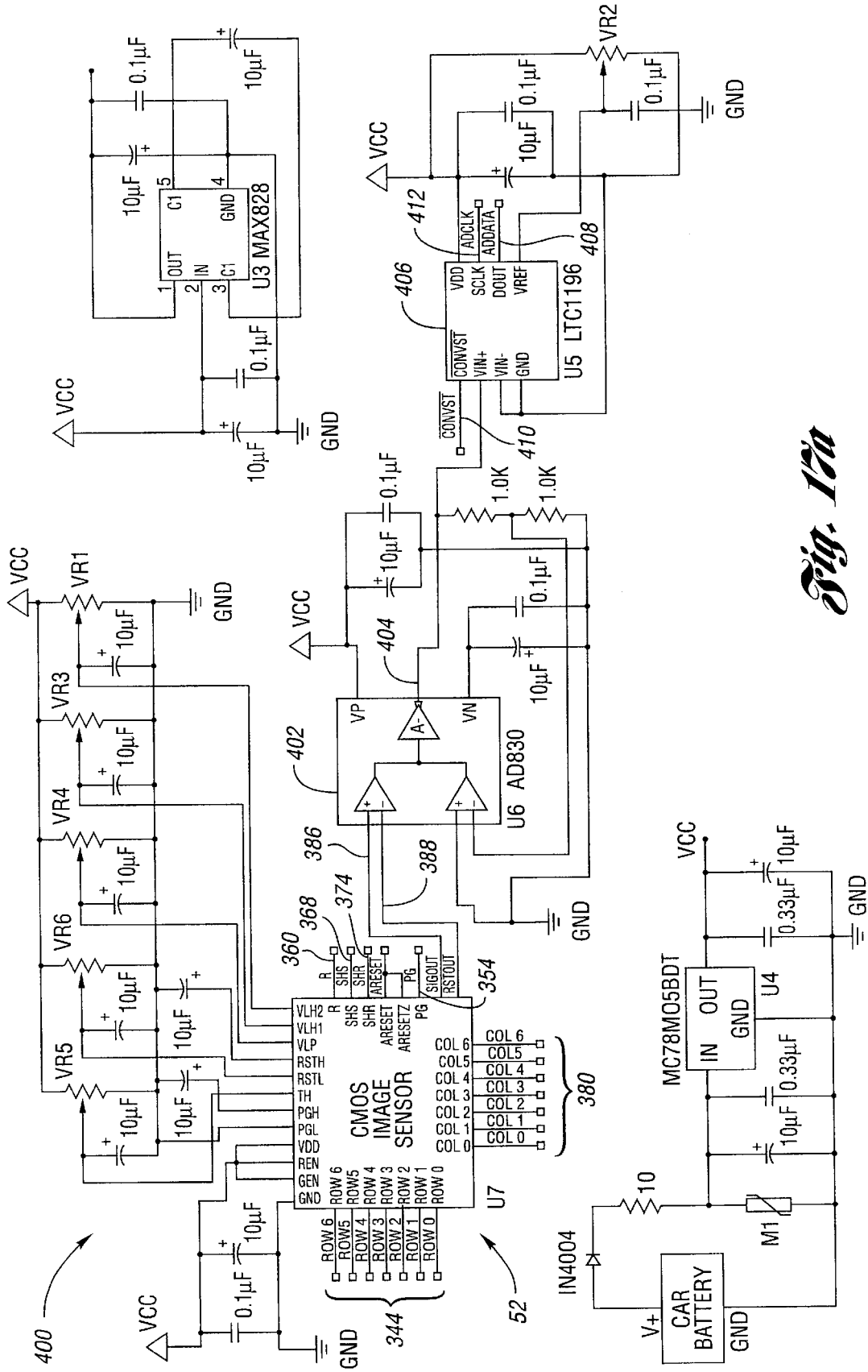
FIGS. 17a through 17e are schematic diagrams of an embodiment of the present invention.
Figure 17B:
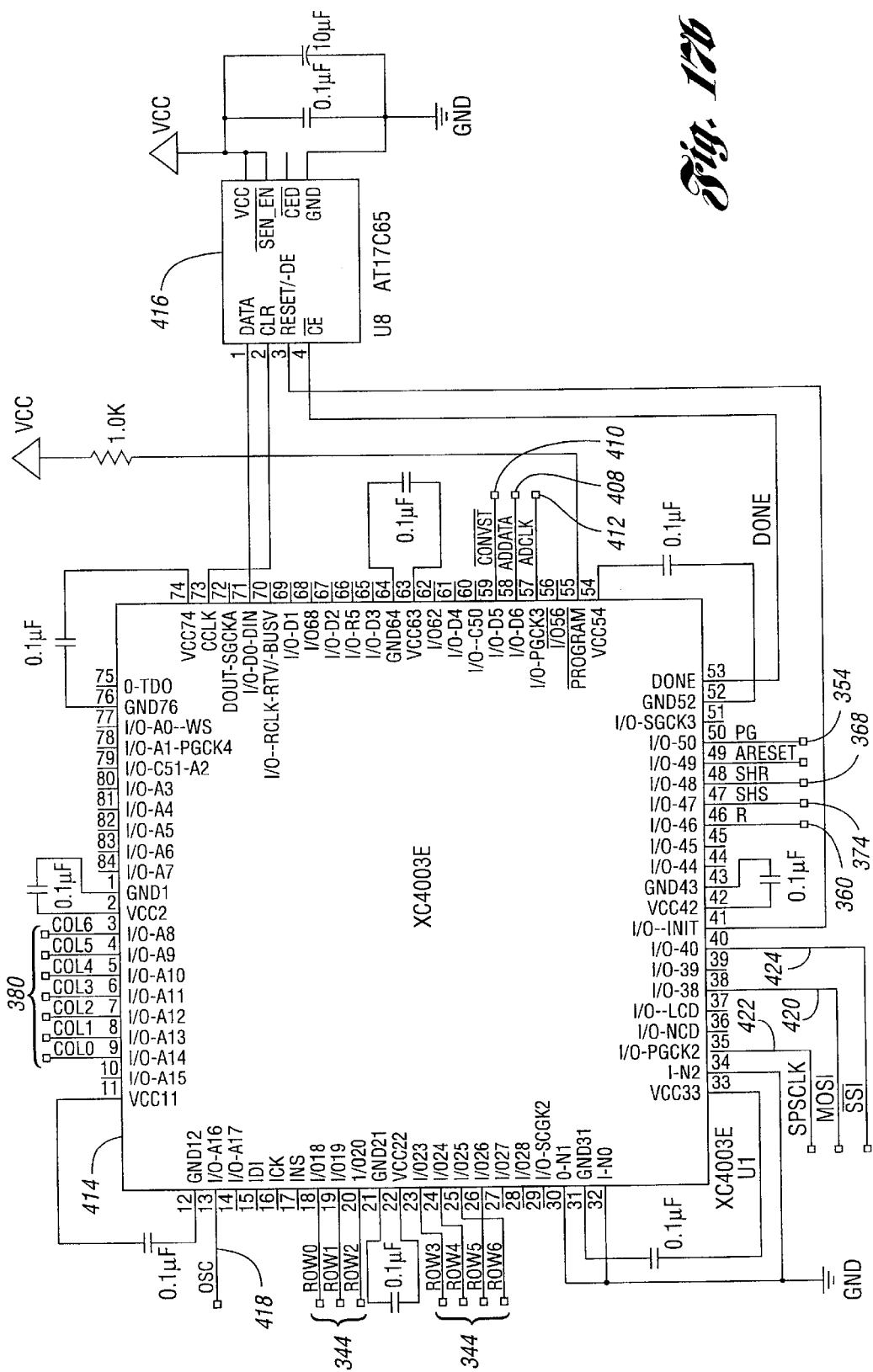

Referring now to FIGS. 17a through 17e, a schematic diagram of an embodiment of the present invention is shown. Much of the circuitry shown in FIGS. 17a and 17b is described in U.S. Pat. No. 5,990,469, entitled "CONTROL CIRCUIT FOR IMAGE ARRAY SENSORS," to Jon H. Bechtel et al., the entire disclosure of which is hereby incorporated by reference.

In FIG. 17a, image array sensor 52 is shown as integrated circuit chip U7. Biasing circuitry 400 is used to set the various voltage levels, such as $V_{TX}$ and $V_{LN}$, required by image array sensor 52. Output SIGOUT 386 and RSTOUT 388 are the illumination potential and reset potential respectively for pixel 240 selected by row address 344 and column address 380. Difference amplifier 402, such as the AD 830 High Speed, Video Difference Amplifier by Analog Devices, accepts SIGOUT 386 and RSTOUT 388 and produces noise-reduced signal 404. ADC 406, such as LTC 1196 by Linear Technology, accepts noise-reduced signal 404 and produces digitized signal (ADDATA) 408. The analog-to-digital conversion is started by asserting conversion signal (CONVST) 410. The converted value is serially shifted out at a rate determined by the input ADC clock signal (ADCLK) 412.

The integrated circuit designated U4 and associated components regulate the approximately 12-volt car battery output to a 5-volt VCC supply voltage. The integrated circuit U3 and associated components produce a conditioned 5-volt supply signal.

In FIG. 17b, application specific integrated circuit (ASIC) 414 is shown. ASIC 414 contains much of the logic for controlling image array sensor 52 and ADC 406 as well as for communicating with processor 66. In the embodiment shown, ASIC 414 is an XC4003E from Xylinx. However, it is well known in the art that a wide range of means are available for implementing the logic in ASIC 414 including discrete logic, custom VLSI integrated circuits, various FPGAs, programmable signal processors, and microcontrollers. The logic implemented by ASIC 414 is described with regards to FIG. 18 below. Serial memory 416, such as the AT17C65 by Atmel, is configured to store and automatically download the code describing the designed logical operation into ASIC 414 each time power is first applied. Clock signal 418, labeled OSC, is generated by processor 66 and drives the sequential logic in ASIC 414.

ASIC 414 communicates with processor 66 using three lines. Data is shifted serially between ASIC 414 and processor 66 on master out slave in (MOSI) 420 at a rate determined by serial peripheral serial clock (SPSCLK) 422 in a direction determined by slave select (SSI) 424. When SSI 424 is asserted, processor 66 is the master and ASIC 414 is the slave. Processor 66 shifts instruction words into ASIC 414. In this mode, processor 66 drives SPSCLK 422. During instruction execution, processor 66 deasserts SSI 424 making ASIC 414 the master and processor 66 the slave. ASIC 414 shifts digitized, noise reduced intensity signals to processor 66. In this mode, ASIC 414 generates SPSCLK 422.

As technology improves, it is desirable to locate image array sensor 52, difference amplifier 402, ADC 406, and the logic implemented in ASIC 414 on a single integrated circuit chip. It may be possible to include processor 66 on such a chip as well.

Figure 17C:
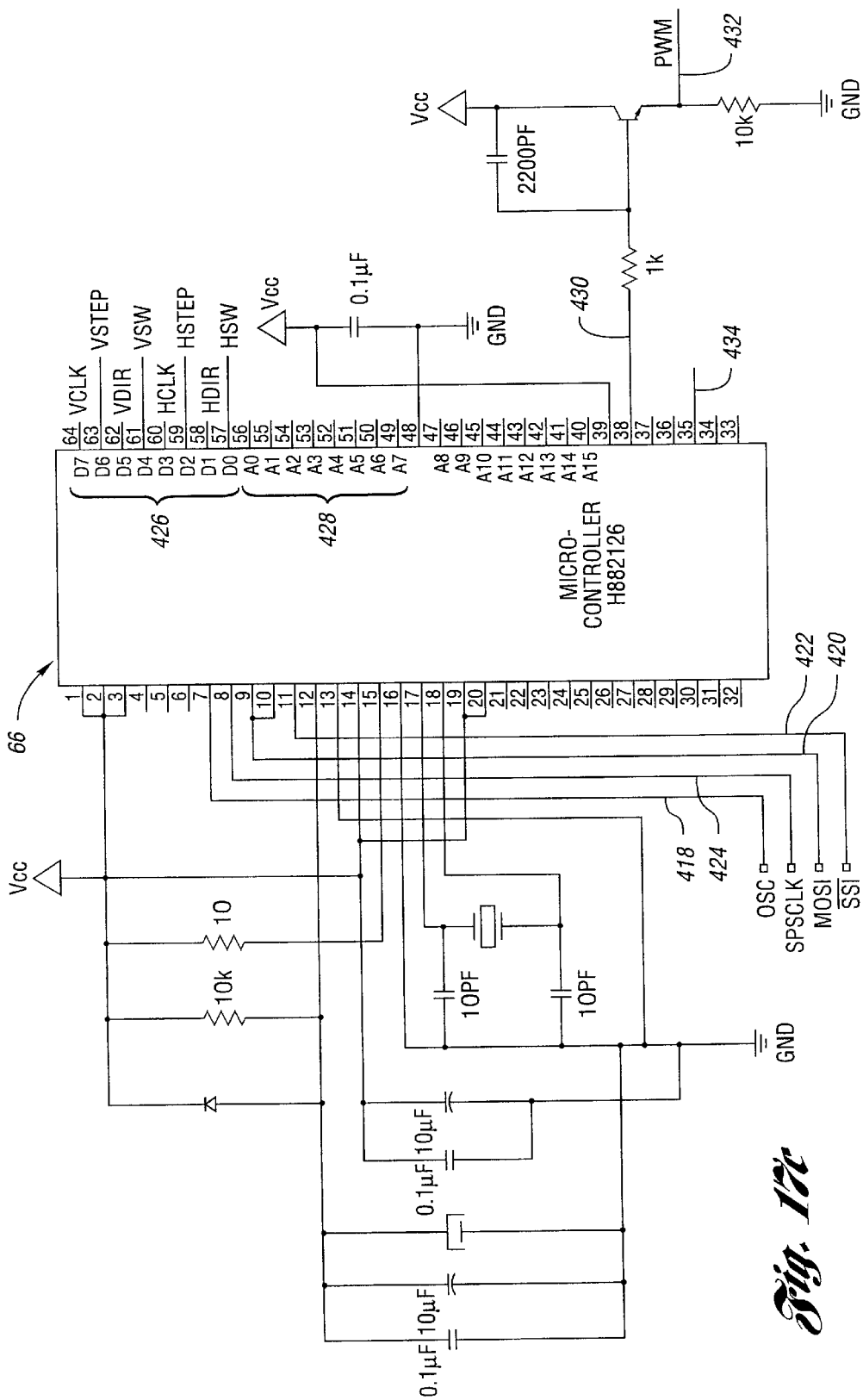

In FIG. 17c, processor 66 and associated electronics are shown. Processor 66 may be an H8S2128 microcontroller from Hitachi. Processor 66 generates instructions for ASIC 414 that determine, in part, which subwindows of image array sensor 52 will be examined. Processor 66 receives digitized intensities from each pixel 240 in designated subwindows of image array sensor 62. Processor 66 uses these intensities to carry out the methods described with regards to FIGS. 3 through 13 above for controlling continuously variable headlamps 22. One necessary function is control of the gain for images acquired using image array sensor 52. As described with regards to FIG. 4 above, the gain for an image used to detect the tail lamps of leading vehicles 28 needs to be greater than the gain for an image used to detect headlamps of oncoming vehicles 26. One or more of several means are possible for controlling image array sensor 52 gain. First, the integration time of pixels 240 can be varied. Second, the reference voltage, VREF, of ADC 406 can be changed. Third, difference amplifier 402 can have a variable, controllable gain. Fourth, a variable aperture or a variable attenuator, such as an electrochromic window, can be placed in the path of light striking image array sensor 52.

The types and numbers of control signals required for headlamps 22 depend on headlamp configuration in controlled vehicle 20. For the embodiment described below, controlled vehicle 20 has two continuously variable high beam headlamps 22 and two continuously variable low beam headlamps 22. Each high beam headlamp 22 can be vertically and horizontally aimed using stepper motors. The intensity of both high beam headlamps 22 is controlled by a single PWM signal. The two low beam headlamps 22 are not steerable but have intensities controlled by a single PWM signal. It is apparent to one of ordinary skill in the art that the present invention can control various configurations of continuously variable headlamps 22.

Processor 66 includes a first set of control signals, shown generally by 426, for controlling the aim of the left high beam headlamp. A similar set of eight control signals, shown generally by 428, are used to control the aim of the right high beam headlamp. Labels have been left off right aim control signals 428 for clarity. A description of aim control signals 426, 428 is provided with regard to FIG. 17e below. Processor 66 also generates high beam modulated signal 430 which is buffered to become high beam PWM signal 432. Identical circuitry may be connected to low beam modulated signal 434. This circuitry has been omitted for clarity. Headlamp controller 76 using PWM signal 432 is described with regards to FIG. 17d below.

In FIG. 17d, headlamp system 46 includes incandescent headlamp 22 and headlamp intensity controller 76. Headlamp intensity controller 76 includes a power FET, such as the IRFZ44N by International Rectifier. The intensity of light emitted by headlamp 22 is proportional to the duty cycle of PWM signal 432. A base frequency for PWM signal 432 of 2000 Hz is preferred. Higher frequencies may increase the power dissipation of the power FET.

In FIG. 17e, headlamp system 46 includes headlamp 22 with variable vertical and horizontal aiming and headlamp controller 76 for providing aiming signals. Headlamp 22 includes vertical stepper motor 440 for controlling vertical aim direction and horizontal stepper motor 442 for controlling horizontal aim direction. Headlamp 22 also includes vertical home switch 444 and horizontal home switch 446 for indicating when headlamp 22 is in the home position. Vertical home switch 444 produces vertical home signal (VSW) 448. Horizontal home switch 446 produces horizontal home signal (HSW) 450. Vertical motor 440 is driven by motor controller 452, such as the SAA1042 by Motorola. Motor controller 452 has three inputs. Vertical direction (VDIR) 454 indicates the direction of rotation of motor 440 for each positive edge on vertical clock (VCLK) 456. Vertical step (VSTEP) indicates whether motor 440 will make a full step or a half step for each applied pulse of VCLK 456. Horizontal motor controller 460 has horizontal direction (HDIR) 462, horizontal clock (HCLK) 464, and horizontal step (HSTEP) 466 which function similar to VDIR 454, VCLK 456, and VSTEP 458 for vertical motor controller 452.

In an alternative embodiment using HID headlamps, the direction of light emitted from one or more headlamps 22 is changed using MDP. HID headlamps operate by producing a charged arc in a gas such as xenon. The arc may be perturbed by the presence of a magnetic field. Reflectors may be designed such that various perturbations of the arc produce changes in the direction, intensity, or both of light emitted by HID headlamp 22.

Aim control signals 426, 428 from processor 66 may be replaced by analog or digital outputs determining the direction for aiming the output of HID headlamp 22. Headlamps utilizing MDP are being developed by Osram Sylvania Inc. of Danvers, Mass.

Figure 18:
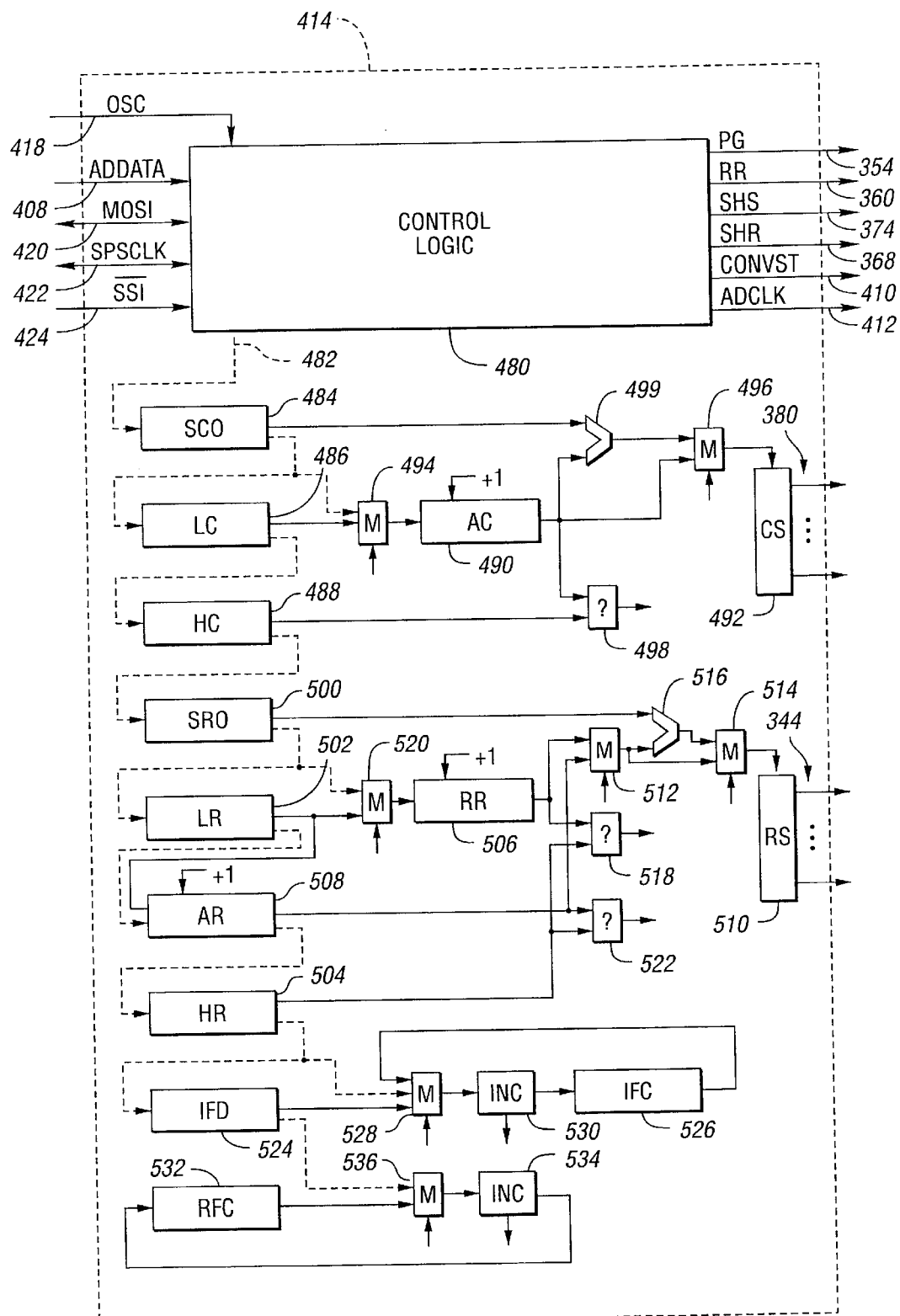
FIG. 18 is a block diagram illustrating registers and associated logic used to control the image control sensor according to an embodiment of the present invention.

Referring now to FIG. 18, a block diagram illustrating registers and associated logic used to control the image control sensor is shown. The logic described below is more completely discussed in U.S. Pat. No. 5,950,469, entitled "CONTROL CIRCUIT FOR IMAGE ARRAY SENSORS," to Jon H. Bechtel et al., the entire disclosure of which is hereby incorporated by reference.

ACSI 414 includes control logic 480 which controls a collection of registers and associated logic. All but two of the registers are initially loaded with data from an instruction serially shifted over MOSI 420 from processor 66. The path used to initialize the registers, indicated by 482, is shown as a dashed line in FIG. 18. The purpose for each of the registers and associated logic will now be described.

ASIC 414 can specify two subwindows within image array sensor 52. The first subwindow is specified by low and high column addresses and low and high row addresses. The second subwindow is specified as having a column offset and a row offset from the first subwindow. Hence, the first and second subwindows have the same size. These two subwindows may be upper subwindow 310 and lower subwindow 318 described with regard to FIG. 15 above. As described with regards to FIG. 16 above, readout and reset of each pixel 240 occurs by rows. Alternate rows from each subwindow are obtained. Each pixel in the selected row of first subwindow is read and then each pixel in the selected row of the second subwindow is read.

Five registers are used to specify column address 380. Second subwindow column offset register (SCO) 484 holds the column offset between the first subwindow and the second subwindow. Low column register (LC) 486 holds the starting column value for the first subwindow. High column register (HC) 488 holds the ending column value of the first subwindow. Active column register (AC) 490 holds the value of the currently examined column in the first subwindow. Column select register (CS) 492 holds column address 380. Multiplexer 494 is initially set so that register AC 490 is loaded with the same column starting value as register LC 486 when processor 66 shifts an instruction into ASIC 414. During instruction execution, multiplexer 496 is initially set so that register CS 492 is loaded with the value of register AC 490. Register AC 490 is incremented to select each column in the first subwindow until the content of register AC 490 is greater than the final column value in register HC 488 as determined by comparator 498. Register AC 490 is then reloaded with the starting column value from register LC 486 through multiplexer 494. Multiplexer 496 is then set so that register CS 492 is loaded with the sum of register AC 490 and register SCO 484 produced by adder 499. As register AC 490 is incremented, register CS 492 then holds successive column addresses 380 of the second subwindow.

Row address 344 is specified using six registers. Second subwindow row offset register (SRO) 500 holds the row offset between the first subwindow and the second subwindow. Low row register (LR) 502 holds the starting row address of the first subwindow. High row register (HR) 504 holds the ending row address of the first subwindow. RR 506 holds the address of the first subwindow row for reset. ADC row register (AR) 508 holds the first subwindow row to be read out for analog-to-digital conversion. Row select register (RS) 510 holds row address 344. Register RR 506 and register AR 508 are used to determine the integration time for each pixel 240. If each row in image array sensor 52 is reset immediately prior to readout, a very short integration time results. If each row is reset immediately following readout, a longer integration period results, the length of which depends on the number of rows in the first subwindow. An additional means for further extending integration time is described below. Four rows must therefore be considered, the reset row of the first subwindow, the reset row of the second subwindow, the conversion row of the first subwindow, and the conversion row of the second subwindow. Multiplexer 512 and multiplexer 514 are first set to pass the contents of register RR 506 into register RS 510. This makes the reset row of the first subwindow row address 344. Multiplexers 512, 514 are then set so that register RS 510 is loaded with the sum of register RR 506 and register SRO 500 produced by adder 516. This makes row address 344 the reset row of the second subwindow. Multiplexers 512, 514 are then set to load register RS 510 with the contents of register AR 508. This makes row address 344 the conversion row of the first subwindow. Multiplexers 512, 514 are then set so that register RS 510 is loaded with the sum of register AR 508 and register SRO 500 produced by adder 516. This makes row address 344 the conversion row of the second subwindow. Register RR 506 and register AR 508 are then incremented. When the contents of register RR 506 are greater than the ending row value held in register HR 504 as determined by comparator 518, register RR 506 is reloaded with the starting row address of the first subwindow from register LR 502 through multiplexer 520. When the value held in register AR 508 is greater than the ending row address in register HR 504 as determined by comparator 522, register AR 508 is loaded with the starting address of the first subwindow from register LR 502.

Two registers allow an integration period greater than the frame period, which is defined as the time required to convert each row in the first subwindow. Integration frame delay register (IFD) 524 holds the two's complement of the number of frame periods for each integration period.

Integration frame counter register (IFC) 526 is initially loaded through multiplexer 528 with the value loaded into register IFD 524 plus one provided by serial incrementer 530. Incrementer 530 has an output indicating overflow. If register IFD 524 is initialized with negative one, incrementer 530 indicates an overflow. This overflow signals control logic 480 to perform row readouts during the next frame period. If an overflow does not occur from incrementer 530, no row readout is performed during the next frame period. At the end of each frame period, the contents of register IFC 526 are passed through incrementer 530 by multiplexer 528 and incrementer 530 overflow is checked again. When overflow occurs, multiplexer 528 gates the contents of register IFD 524 through incrementer 530 into register IFC 526 and the process is repeated.

Reset frame count register (RFC) 532 is initialized with the two's complement of the number of frames to be read plus one. This value is used to indicate the number of times in which an instruction shifted in from processor 66 is to be repeated. At the end of each frame in which all rows of the first and second subwindows have been read, the overflow output of incrementer 534 is examined. If an overflow has occurred, the instruction is completed and no further processing occurs. If no overflow has occurred, the contents of register RFC 532 are passed through multiplexer 536 and incremented by incrementer 534.

Outputs from comparators 498, 518, 522 and incrementers 530, 534 are used by control logic 480 to generate internal control signals for multiplexers 494, 496, 520, 512, 514, 528, 536 and incrementers for registers 490, 506, 508 as well as for external control signals such as PG 354, RR 360, SHS 374, SHR 368, CONVST 410, and ADCLK 412.

Figure 19:
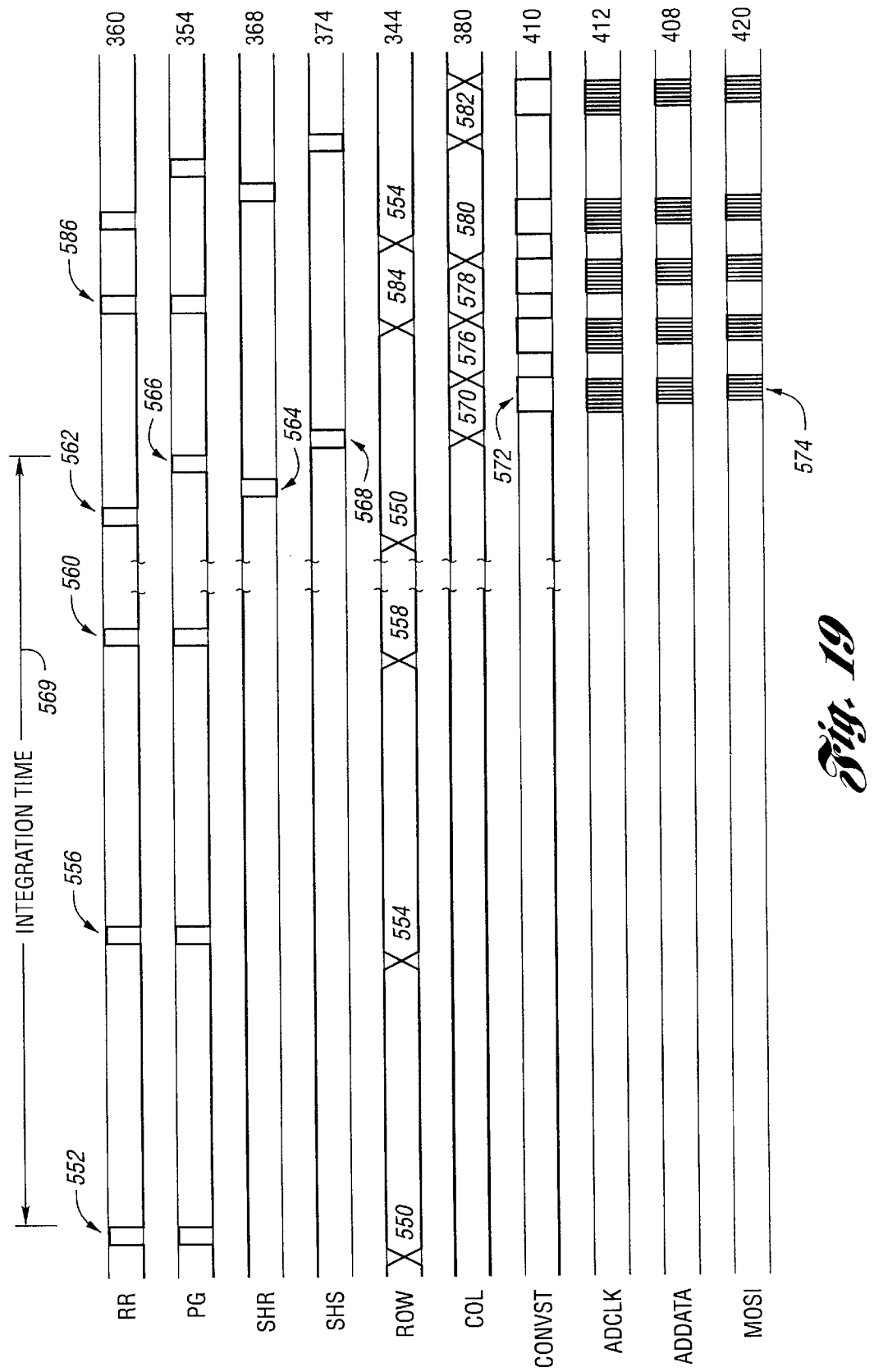
FIG. 19 is a timing diagram illustrating image array sensor control signals for the logic in FIG. 18.

Referring now to FIG. 19, a timing diagram illustrating image array sensor control signals is shown. The timing diagram is provided to show timing relationships between signals and not necessarily precise times between signal events.

The beginning of the timing diagram in FIG. 19 corresponds with the start of an instruction execution by ASIC 414. Row address (ROW) 344 is first set to the starting row of the first subwindow, as shown by 550. Signals RR 360 and PG 354 are then asserted dumping any charge that may be beneath photogate 330 in each pixel 240 in row 550, as shown generally by 552. Row address 344 is then set to the first row of the second subwindow, as shown by 554. Again, signals RR 360 and PG 354 are asserted, as shown by 556, to reset all pixels 240 in second subwindow first row 554. Row address 344 is then set to the first subwindow second row, as shown by 558, and signals RR 360 and PG 354 are asserted as shown by 560. This process continues by alternately resetting the next row from the first subwindow then the corresponding row from the second subwindow.

At some point in the future, the time arrives to read the values from each pixel 240 in the first row of the first subwindow. Row address 344 is again set to first subwindow first row address 550. Signal RR 360 is asserted, as shown by 562, to dump any charge under floating diffusion 334. Next, signal SHR 564 is asserted to gate the reset potential for each pixel 240 in first subwindow first row 550 into capacitor 372 of corresponding column readout circuit 342. Next, signal PG 354 is asserted, as shown by 566, to transfer charge accumulated under photogates 330 to floating diffusions 334. Signal SHS 374 is then asserted, as shown by 568, to gate the illumination potential for each pixel 240 into capacitor 378 of corresponding column readout circuit 342. Integration period 569 is the time between deasserting signal PG 354 during reset 569 and asserting signal PG 354 during readout 566.

The conversion process for each column in first subwindow first row 550 can now begin. Column address (COL) 380 is set to first window first column, as shown by 570. Signal CONVST 410 is then asserted at 572. This causes ADC 406 to begin conversion. ASIC 414 provides a sequence of clock pulses on ADCLK 412 and receives the digitized illumination value serially on ADDATA 408. ASIC 414 immediately shifts the data to processor 66 over MOSI 420 as shown by 574. In the example shown in FIG. 19, each subwindow contains only four columns. The addresses for first subwindow second column 576, third column 578, and fourth column 580 are successively used as column address 380, and the conversion process is repeated.

Row address 344 can then be set to second subwindow first row 554 and the sequence of assertions for signals RR 360, SHR 368, PG 354, and SHS 374 repeated to load column readout circuits 342 with reset and illumination potentials. Column address 380 can be set to second subwindow first column 382 and the conversion sequence can be repeated.

Note that, since the conversion process uses reset and illumination potentials stored in readout circuits 342 and column address 380 but not row address 344 and that row reset requires row address 344 but not column address 380 or readout circuits 342, row reset may be interleaved with the conversion process. This is seen in FIG. 19 where, following assertion of SHS signal 374 at 568, row address 344 is set to the first subwindow $n^{th}$ row address 584 and signals RR 360 and PG 354 are asserted at 586 to reset all pixels 240 in first subwindow $n^{th}$ row 584.

Referring now to FIG. 20, an ambient light sensor that may be used to implement the present invention is shown. The ambient light sensor may be incorporated into imaging system 42. The ambient light sensor is described more fully in U.S. Pat. No. 6,130,421, entitled "IMAGING SYSTEM FOR VEHICLE HEADLAMP CONTROL," to Jon H. Bechtel et al., the entire disclosure of which is hereby incorporated by reference.

Ambient light lens system 54 includes baffle 600 built onto the front of housing 280. Baffle 600 is angled at an angle θ of approximately 45° with the horizontal of controlled vehicle 20. Baffle 600 defines aperture 602 opening towards the front of controlled vehicle 20. Aperture 602 may be trapezoidal such that the projection of aperture 602 onto a vertical surface would form a rectangle on the vertical surface. Lens 604 is mounted in one side of aperture 602. The width of lens 604 is approximately the same as the diameter of red lens 286 or cyan lens 288. Lens 604 accepts light rays over a wide elevational range, such as vertical ray 606 and horizontal ray 608, and directs these rays into an approximately horizontal direction. Lens 604 is positioned so that a blurred, inverted image of lens 604 is projected by red lens 286 onto one edge of image array sensor 52 between top border 302 and border 316 to form red sky image 610. Lens 604 is also positioned so that a blurred, inverted image of lens 604 is projected by cyan lens 288 between bottom border 304 and border 320 to form cyan sky image 612. The active length of lens 604 is made short enough to permit the entire active length to be projected onto red sky image 610 and cyan sky image 612.

Red sky image 610 and cyan sky image 612 are examined in processor 66 to determine an ambient light level. The intensity values may be averaged to determine ambient light levels. Lens 604 may be designed so that light 56 from different ranges of elevational angles appears in different regions of lens 604. In this case, light levels from different ranges of elevational angles may be weighted higher than from other ranges of elevation angles when an average is determined. For example, near vertical light may be weighted highest and near horizontal light may be weighted lowest. Also, since red sky image 610 and cyan sky image 612 are correlated, intensities as a function of color may be obtained. For example, the effective ambient light level may be increased for a blue sky as compared with a cloudy sky.

Referring now to FIG. 21, a diagram illustrating mounting of a moisture sensor that may be used to implement the present invention is shown. Moisture sensor 74, as well as imaging system 42, may be constructed into mounting bracket 620 of interior rearview mirror 622. Moisture sensor 74 may be mounted two to three inches behind windshield 624 of controlled vehicle 20.

Referring now to FIG. 22, a diagram illustrating operation of a moisture sensor that may be used to implement the present invention is shown. Moisture sensor 74 and associated control system are described in U.S. Pat. No. 5,923,027, entitled "MOISTURE SENSOR AND WINDSHIELD FOG DETECTOR," by Joseph S. Stam et al., which is hereby incorporated by reference.

Moisture sensor 74 includes image array sensor 630, lens 632, and light source 634. Lens 632 is designed to focus windshield 624 onto image array sensor 630. Moisture sensor 74 operates in two modes, one for detecting droplets on windshield 624 and one for detecting fog on windshield 624. The first mode uses the focusing effect of a droplet of water. When windshield 624 is dry, the scene appearing on image array sensor 630 will be blurred since the scene has an effective focal length of infinity and lens 632 is focused on windshield 624. If droplets of water due to precipitation, such as rain or snow, are present on windshield 624, portions of the scene viewed by image array sensor 630 will be more sharply focused. Since an unfocused scene has less high frequency spatial components than a sharply focused scene, examining the output of image array sensor 630 for high spatial frequency components will provide an indication of droplets on windshield 624. In the second operating mode, light source 634 shines a beam of light, shown generally by 636, onto windshield 624. If no fog is present on windshield 624, beam 636 will pass through windshield 624 and will not be seen by image array sensor 630. If fog is present on the interior of window 624, beam 636 will be reflected as interior light spot 638 which will be detected by image array sensor 630. Likewise, if fog is on the exterior but not the interior of window 624, beam 636 will be reflected as exterior light spot 640 which will be seen by image array sensor 630. If light spot 638, 640 is seen by image array 630, the relative height of light spot 638, 640 in the image can be used to determine whether the fog is on the interior or exterior of windshield 624.

Image array sensor 630 may be similar in construction to image array sensor 52. However, the number of pixels required for image array sensor 630 is significantly less than for image array sensor 52. A 64×64 array of pixels is considered to be appropriate for image array sensor 630. The angle of windshield 624 in current passenger cars is about 27°. Such a configuration may cause raindrops and other moisture to be at different distances from the image sensor depending on where the moisture is on windshield 624. To help compensate for this problem, the top of image array sensor 630 may be angled approximately 10° toward windshield 624.

In a preferred embodiment, lens 632 is a single biconvex lens having a 6 mm diameter, front and rear radius of curvature of 7 mm for each surface, and a center thickness of 2.5 mm. The front surface of lens 632 may be positioned 62 mm from the outer surface of windshield 624. Mounting bracket 620 may form a stop of about 5 mm directly in front of lens 632. Image array sensor 630 may be located about 8.55 mm from the rear surface of lens 632.

Light source 634 is preferably a light emitting diode (LED). Light source 634 either emits highly collimated light or, as in the embodiment shown in FIG. 22, lens 642 is used to focus the light from light source 634 onto windshield 624. Light source 634 may emit visible light or, preferably, infrared light so as not to create a distraction for the driver of the controlled vehicle 20. Light source 634 may be positioned a few millimeters above lens 632 and angled so that beam 636 strikes windshield 624 in an area imaged by image array sensor 630.

The output from image array sensor 630 must be processed in a manner similar to the output of image array sensor 52. A separate image array control and ADC, similar to control and ADC 64, and processor, similar to processor 66, may be provided for this purpose. Alternately, a separate imaging array control and ADC may be used with processor 66. A further embodiment is to use the same control unit 44 for the output of both image array sensor 52 and moisture sensor 74. Processor 66 would control which image array sensor 52, 630 was being examined.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An illumination control system for controlling exterior illumination lights of a controlled vehicle where the exterior lights are capable of producing different illumination patterns, wherein at least one of the exterior lights includes a filament and produces illumination by heating the filament, said control system comprising:

an array of sensors for generating electrical signals; and a control circuit in communication with the exterior lights and operable to acquire and process electrical signals received from said array of sensors to determine if at least one vehicle is in front of the controlled vehicle and, if at least one vehicle is detected in front of the controlled vehicle, said control circuit is operable to change the illumination pattern of the exterior lights, wherein, when the at least one exterior light including a filament is not to emit light, a low amount of current is supplied to the filament so as to heat the filament without causing the filament to emit light.

2. The illumination control system of claim 1, wherein said array of sensors is a two-dimensional array of sensors.

3. The illumination control system of claim 1, wherein said control circuit causes low amount of current to be supplied to the filament.

4. The illumination control system of claim 1, wherein said control circuit generates a pulse-width modulated control signal and supplies the pulse-width modulated control signal to at least one of said exterior lights.

5. An illumination control system for controlling exterior illumination lights of a controlled vehicle where the exterior lights are capable of producing different illumination patterns, said control system comprising:

an array of light sensors for generating electrical signals; and a control circuit in communication with the exterior lights and operable to acquire and process electrical signals received from said array of sensors to determine if at least one vehicle is in front of the controlled vehicle and, if at least one vehicle is detected in front of the controlled vehicle, said control circuit is operable to change the illumination pattern of the exterior lights, wherein said control circuit limits the maximum inrush current to at least one of the exterior lights.

6. The illumination control system of claim 5, wherein said control circuit generates a pulse-width modulated control signal and supplies the pulse-width modulated control signal to at least one of said exterior lights to limit the maximum inrush current thereto.

7. The illumination control system of claim 5, wherein said control circuit limits inrush current by gradually fading on the exterior lights.

8. The illumination control system of claim 5, wherein said control circuit compares a light level sensed by each sensor to a threshold value to determine whether a light source is present in front of the controlled vehicle, said control circuit adjusts the threshold value as a function of a sensed ambient light level.

9. An illumination control system for controlling exterior illumination lights of a controlled vehicle where the exterior lights are capable of producing different illumination patterns, said control system comprising:

an array of sensors, said sensors generating electrical signals representing a light level sensed by each sensor; and a control circuit in communication with the exterior lights and operable to acquire and process electrical signals received from said array of sensors to determine if at least one vehicle is in front of the controlled vehicle and, if at least one vehicle is detected in front of the controlled vehicle, said control circuit is operable to change the illumination pattern of the exterior lights, wherein said control circuit compares the light level sensed by each sensor to a threshold value to determine whether a light source is present in front of the controlled vehicle, said control circuit adjusts the threshold value as a function of a sensed ambient light level.

10. The illumination control system of claim 9, wherein said control circuit limits the maximum inrush current to at least one of the exterior lights.

11. The illumination control system of claim 9, wherein said control circuit is operable to increase the illumination range of at least one of the exterior lights in proportion to increasing vehicle speed except when vehicles are detected in front of the controlled vehicle.

12. The system of claim 9 and further comprising a moisture sensor operable to detect moisture, wherein said control circuit is in communication with the moisture sensor, the control circuit being operable to control operation of the at least one exterior vehicle light as a function of the detection of moisture.

13. The system of claim 12 and further comprising a first lens for focusing an image to the front of the vehicle onto said array of sensors.

14. The system of claim 12, wherein said moisture sensor includes a second array of sensors coupled to said control circuit, and a second lens for focusing light onto said second array of sensors.

15. The system of claim 12, wherein said control unit further controls windshield wipers of the controlled vehicle in response to the moisture sensor.

16. The system of claim 12, wherein said array of sensors is a two-dimensional array of sensors.

17. An illumination control system for controlling exterior illumination lights of a controlled vehicle where the exterior lights are capable of producing different illumination patterns, said control system comprising:

an array of light sensors for generating electrical signals; and a control circuit in communication with the exterior lights and operable to acquire and process electrical signals received from said array of sensors to determine if at least one vehicle is in front of the controlled vehicle and, if at least one vehicle is detected in front of the controlled vehicle, said control circuit is operable to change the illumination pattern of the exterior lights, wherein said control circuit is operable to adjust the illumination range of at least one of the exterior lights as a function of both the speed of the controlled vehicle and the detection of a vehicle in front of the controlled vehicle.

18. The illumination control system of claim 17, wherein said control circuit is operable to increase the illumination range of at least one of the exterior lights in proportion to increasing vehicle speed except when a vehicle is detected in front of the controlled vehicle.

19. The illumination control system of claim 17, wherein said control circuit is operable to automatically calibrate the aim of the array of light sensors relative to the controlled vehicle based upon images detected by said array of light sensors.

20. The illumination control system of claim 17, wherein said control circuit limits the maximum inrush current to at least one of the exterior lights.

21. The illumination control system of claim 17, wherein said control circuit compares a light level sensed by each sensor to a threshold value to determine whether a light source is present in front of the controlled vehicle, said control circuit adjusts the threshold value as a function of a sensed ambient light level.

22. A system for controlling at least one continuously variable headlamp on a controlled vehicle, each continuously variable headlamp having an effective illumination range varied by changing vertical direction aimed, the system comprising:

an imaging system capable of determining lateral and elevational locations of headlamps from vehicles in front of the controlled vehicle; and a control unit in communication with the imaging system and the at least one continuously variable headlamp, the control unit operable to:
(a) acquire an image in front of the at least one continuously variable headlamp, the image covering a glare area including points at which a driver of a vehicle in front of the at least one continuously variable headlamp would perceive the at least one continuously variable headlamp to cause excessive glare,
(b) process the image to determine if at least one vehicle is within the glare area,
(c) if at least one vehicle is within the glare area, determine the elevational angle between the imaging system and the lights of each of the at least one vehicle, and
(d) if at least one vehicle is within the glare area, vertically aim the at least one continuously variable headlamp such that the at least one continuously variable headlamp does not cause glare for the at least one vehicle.

23. An illumination control system for controlling exterior illumination lights of a controlled vehicle where the exterior lights are capable of producing different illumination patterns, said control system comprising:

an imaging system for obtaining an image to the front of the controlled vehicle, said imaging system including an array of sensors each generating electrical signals representing a light level sensed by the sensor; and a control circuit in communication with the exterior lights and operable to acquire and process electrical signals received from said array of sensors to determine if at least one vehicle is in front of the controlled vehicle and, if at least one vehicle is detected in front of the controlled vehicle, said control circuit is operable to change the illumination pattern of the exterior lights, wherein said control circuit is operable to automatically calibrate the aim of the imaging system relative to the controlled vehicle based upon images detected by said imaging system.

24. The illumination control system of claim 23, wherein said control circuit automatically calibrates the aim of the imaging system when the controlled vehicle is positioned in front of a target that can be seen by said imaging system.

25. The illumination control system of claim 23, wherein said control circuit automatically calibrates the aim of the imaging system by noting changes in the relative position of street lamps in an image detected by said imaging system.

26. An illumination control system for controlling exterior illumination lights of a controlled vehicle where the exterior lights are capable of producing different illumination patterns, said control system comprising:

an imaging system for obtaining an image to the front of the controlled vehicle, said imaging system including an array of sensors each generating electrical signals representing a light level sensed by the sensor, said array of sensors being divided into at least two subwindows; and a control circuit in communication with the exterior lights and operable to acquire electrical signals received from said array of sensors and to process the electrical signals from said subwindows to determine if at least one vehicle is in front of the controlled vehicle and, if at least one vehicle is detected in front of the controlled vehicle, said control circuit is operable to change the illumination pattern of the exterior lights.

27. The illumination control system of claim 26, wherein said control circuit is operable to automatically calibrate the aim of said imaging system relative to the controlled vehicle based upon images detected by said imaging system.

28. The illumination control system of claim 26, wherein said control circuit limits the maximum inrush current to at least one of the exterior lights.

29. The illumination control system of claim 26, wherein said control circuit compares a light level sensed by each sensor to a threshold value to determine whether a light source is present in front of the controlled vehicle, said control circuit adjusts the threshold value as a function of a sensed ambient light level.

30. The illumination control system of claim 26, wherein said control circuit is operable to increase the illumination range of at least one of the exterior lights in proportion to increasing vehicle speed except when vehicles are detected in front of the controlled vehicle.

* * * * *